(12) United States Patent
Bobak et al.

(10) Patent No.: US 8,826,077 B2
(45) Date of Patent: Sep. 2, 2014

(54) DEFINING A COMPUTER RECOVERY PROCESS THAT MATCHES THE SCOPE OF OUTAGE INCLUDING DETERMINING A ROOT CAUSE AND PERFORMING ESCALATED RECOVERY OPERATIONS

(75) Inventors: Mythili K. Bobak, Lagrangeville, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 11/965,862

(22) Filed: Dec. 28, 2007

(65) Prior Publication Data

US 2009/0172460 A1 Jul. 2, 2009

(51) Int. Cl.
*G06F 11/00* (2006.01)
*G06F 11/22* (2006.01)

(52) U.S. Cl.
USPC .................. 714/26; 714/37; 714/46

(58) Field of Classification Search
USPC .................. 714/26, 37, 40, 46, 36
See application file for complete search history.

(56) References Cited

U.S. PATENT DOCUMENTS

| | | | |
|---|---|---|---|
| 4,979,105 A * | 12/1990 | Daly et al. | 714/10 |
| 5,023,873 A | 6/1991 | Stevenson et al. | 371/8.2 |
| 5,386,561 A | 1/1995 | Huynh et al. | |
| 5,452,452 A | 9/1995 | Gaetner et al. | |
| 5,481,694 A | 1/1996 | Chao et al. | 395/439 |
| 5,530,802 A * | 6/1996 | Fuchs et al. | 714/17 |
| 5,537,542 A | 7/1996 | Eilert et al. | |
| 5,604,863 A | 2/1997 | Allen et al. | |
| 5,631,831 A * | 5/1997 | Bird et al. | 701/34.4 |
| 5,652,908 A | 7/1997 | Douglas et al. | |
| 5,734,837 A | 3/1998 | Flores et al. | |
| 5,790,780 A * | 8/1998 | Brichta et al. | 714/46 |
| 5,797,005 A | 8/1998 | Bahls et al. | |
| 5,797,129 A | 8/1998 | Rohan | |
| 5,826,080 A | 10/1998 | Dworzecki | |
| 5,887,168 A | 3/1999 | Bahls et al. | |
| 6,012,044 A | 1/2000 | Maggioncalda et al. | |
| 6,012,152 A * | 1/2000 | Douik et al. | 714/26 |
| 6,041,306 A | 3/2000 | Du et al. | |
| 6,125,442 A | 9/2000 | Maves et al. | |

(Continued)

FOREIGN PATENT DOCUMENTS

WO    WO 99/10814    3/1999    ............ G06F 13/00

OTHER PUBLICATIONS

"Recovery from software faults in the EWSD digital switching system" by E.L. Hunter Published in: IEEE International Conference on Communications, 1994.*
"BPEL Project", http://www.eclipse.org/bpel/.

(Continued)

*Primary Examiner* — Joseph Schell
(74) *Attorney, Agent, or Firm* — Margaret McNamara, Esq.; Blanche E. Schiller, Esq.; Heslin Rothenberg Farley & Mesiti P.C.

(57) ABSTRACT

Recovery processing is defined that matches the scope of an outage. A programmatic analysis of the resources that have been impacted, of implications of the failure and what degradations have occurred is performed to construct an appropriate level of recovery. This includes selecting the appropriate set of resources to be recovered. Recovery operations are selected based on the current state of the environment.

20 Claims, 27 Drawing Sheets

(56) References Cited

U.S. PATENT DOCUMENTS

| | | |
|---|---|---|
| 6,336,138 B1 | 1/2002 | Caswell et al. |
| 6,385,613 B1 | 5/2002 | Grewell et al. ............... 707/8 |
| 6,393,386 B1 | 5/2002 | Zager et al. |
| 6,393,485 B1 | 5/2002 | Chao et al. ............... 709/231 |
| 6,408,277 B1 | 6/2002 | Nelken |
| 6,449,688 B1 | 9/2002 | Peters et al. ............... 711/112 |
| 6,480,944 B2 | 11/2002 | Bradshaw et al. |
| 6,625,751 B1 | 9/2003 | Starovic et al. |
| 6,732,118 B2 | 5/2004 | Hermann et al. |
| 6,785,768 B2 | 8/2004 | Peters et al. ............... 711/112 |
| 6,862,696 B1 | 3/2005 | Voas et al. |
| 6,874,010 B1 | 3/2005 | Sargent |
| 6,934,247 B2 | 8/2005 | Bhattal et al. ............... 370/216 |
| 6,954,786 B1 | 10/2005 | Vered et al. |
| 6,983,321 B2 | 1/2006 | Trinon et al. |
| 6,983,362 B1 | 1/2006 | Kidder et al. |
| 7,032,186 B1 | 4/2006 | Gasser et al. |
| 7,039,827 B2* | 5/2006 | Meyer et al. ............... 714/4.11 |
| 7,047,337 B2 | 5/2006 | Armstrong et al. |
| 7,058,947 B1 | 6/2006 | Raja et al. |
| 7,111,297 B1 | 9/2006 | Sankaranarayan et al. |
| 7,197,749 B2 | 3/2007 | Thornton et al. |
| 7,243,267 B2 | 7/2007 | Klemm et al. |
| 7,281,018 B1 | 10/2007 | Begun et al. |
| 7,313,573 B2* | 12/2007 | Leung et al. ............... 1/1 |
| 7,325,161 B1 | 1/2008 | Rakic et al. |
| 7,395,537 B1 | 7/2008 | Brown et al. |
| 7,409,356 B1 | 8/2008 | Geddes et al. |
| 7,437,611 B2* | 10/2008 | Agarwal et al. ............... 714/26 |
| 7,463,648 B1 | 12/2008 | Eppstein et al. |
| 7,490,265 B2* | 2/2009 | Baskey et al. ............... 714/15 |
| 7,499,954 B2 | 3/2009 | Cherkauer et al. |
| 7,509,529 B2* | 3/2009 | Colucci et al. ............... 714/14 |
| 7,523,359 B2* | 4/2009 | Richards et al. ............... 714/49 |
| 7,529,981 B2 | 5/2009 | Childress et al. |
| 7,536,585 B1 | 5/2009 | Keeton et al. |
| 7,568,019 B1 | 7/2009 | Bhargava et al. |
| 7,587,483 B1 | 9/2009 | Florissi et al. |
| 7,610,512 B2 | 10/2009 | Gerber |
| 7,620,953 B1 | 11/2009 | Tene et al. |
| 7,627,728 B1 | 12/2009 | Roeck et al. |
| 7,650,341 B1 | 1/2010 | Oratovsky et al. |
| 7,661,033 B2* | 2/2010 | Challener et al. ............... 714/39 |
| 7,707,173 B2 | 4/2010 | Nanavati et al. |
| 7,707,451 B2* | 4/2010 | Buskens et al. ............... 714/2 |
| 7,730,363 B2* | 6/2010 | Takezawa et al. ............... 714/47 |
| 7,743,001 B1 | 6/2010 | Vermeulen et al. |
| 7,747,730 B1 | 6/2010 | Harlow |
| 7,752,310 B2 | 7/2010 | Kageyama |
| 7,774,457 B1 | 8/2010 | Talwar et al. |
| 7,774,458 B2 | 8/2010 | Trinon et al. |
| 7,818,421 B2 | 10/2010 | Machida |
| 7,865,582 B2 | 1/2011 | Santos et al. |
| 7,917,814 B2* | 3/2011 | Hu et al. ............... 714/57 |
| 7,933,872 B2 | 4/2011 | Kulkarni et al. |
| 7,934,119 B2 | 4/2011 | Takamoto et al. |
| 7,937,706 B2 | 5/2011 | Casotto |
| 7,958,393 B2 | 6/2011 | Bobak et al. |
| 7,962,590 B1 | 6/2011 | Or et al. |
| 8,051,106 B2 | 11/2011 | Bird |
| 8,065,554 B2* | 11/2011 | Herscovitz et al. ............ 714/4.1 |
| 8,086,758 B1 | 12/2011 | Allan et al. |
| 8,260,893 B1 | 9/2012 | Bandhole et al. |
| 2001/0056398 A1 | 12/2001 | Scheirer |
| 2001/0056554 A1 | 12/2001 | Chrabaszcz |
| 2002/0022952 A1* | 2/2002 | Zager et al. ............... 703/22 |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078130 A1 | 6/2002 | Thornton et al. |
| 2002/0078381 A1 | 6/2002 | Farley et al. |
| 2002/0091991 A1 | 7/2002 | Castro |
| 2002/0194045 A1 | 12/2002 | Shay et al. |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 | 5/2003 | Gahan et al. |
| 2003/0093672 A1 | 5/2003 | Cichowlas |
| 2003/0135384 A1 | 7/2003 | Nguyen |
| 2003/0135609 A1 | 7/2003 | Carlson et al. |
| 2003/0139956 A1 | 7/2003 | Guenther et al. |
| 2003/0200482 A1* | 10/2003 | Sullivan ............... 714/25 |
| 2003/0212580 A1 | 11/2003 | Shen |
| 2003/0212685 A1 | 11/2003 | Rakotoarivelo et al. |
| 2003/0225602 A1 | 12/2003 | Hagmann et al. |
| 2003/0236677 A1 | 12/2003 | Casati et al. |
| 2004/0034553 A1 | 2/2004 | Cole et al. |
| 2004/0054690 A1 | 3/2004 | Hillerbrand et al. |
| 2004/0078373 A1 | 4/2004 | Ghoneimy et al. |
| 2004/0111702 A1 | 6/2004 | Chan |
| 2004/0119752 A1 | 6/2004 | Beringer et al. |
| 2004/0143470 A1 | 7/2004 | Myrick et al. |
| 2004/0158777 A1 | 8/2004 | Bae et al. |
| 2004/0162741 A1 | 8/2004 | Flaxer et al. |
| 2004/0181476 A1 | 9/2004 | Smith et al. |
| 2004/0186905 A1 | 9/2004 | Young et al. |
| 2004/0193476 A1 | 9/2004 | Aerdts |
| 2004/0199768 A1 | 10/2004 | Nail |
| 2004/0210452 A1 | 10/2004 | Aboujaoude et al. |
| 2004/0243699 A1 | 12/2004 | Koclanes et al. |
| 2005/0015641 A1 | 1/2005 | Alur et al. |
| 2005/0027835 A1 | 2/2005 | Raikar et al. |
| 2005/0033600 A1 | 2/2005 | Geddes et al. |
| 2005/0043977 A1 | 2/2005 | Ahern et al. |
| 2005/0049906 A1 | 3/2005 | Leymann et al. |
| 2005/0060662 A1 | 3/2005 | Soares et al. |
| 2005/0071470 A1 | 3/2005 | O'Brien et al. |
| 2005/0086091 A1 | 4/2005 | Trumbly et al. |
| 2005/0091351 A1 | 4/2005 | Badovinatz et al. |
| 2005/0096949 A1 | 5/2005 | Aiber et al. |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0198244 A1 | 9/2005 | Eilam et al. |
| 2005/0228707 A1 | 10/2005 | Hendrickson |
| 2005/0228852 A1 | 10/2005 | Santos et al. |
| 2005/0235248 A1 | 10/2005 | Victoria et al. |
| 2005/0262242 A1 | 11/2005 | Byers et al. |
| 2006/0004265 A1 | 1/2006 | Pulkkinen et al. |
| 2006/0010234 A1 | 1/2006 | Reedy et al. |
| 2006/0020866 A1 | 1/2006 | Lo et al. |
| 2006/0037022 A1 | 2/2006 | Byrd et al. |
| 2006/0041505 A1 | 2/2006 | Enyart |
| 2006/0064335 A1 | 3/2006 | Goldszmidt et al. |
| 2006/0074731 A1 | 4/2006 | Green et al. |
| 2006/0074736 A1 | 4/2006 | Shukla et al. |
| 2006/0074993 A1 | 4/2006 | Pulamarasetti et al. |
| 2006/0106626 A1 | 5/2006 | Jeng et al. |
| 2006/0111921 A1 | 5/2006 | Chang et al. |
| 2006/0112383 A1 | 5/2006 | Chang et al. |
| 2006/0117221 A1 | 6/2006 | Fisher et al. |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0190775 A1 | 8/2006 | Aggarwal et al. |
| 2006/0218558 A1 | 9/2006 | Torii et al. |
| 2006/0224702 A1 | 10/2006 | Schmidt et al. |
| 2006/0236061 A1 | 10/2006 | Koclanes |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0259526 A1 | 11/2006 | Booz et al. |
| 2006/0287875 A1 | 12/2006 | Reddy et al. |
| 2006/0293942 A1 | 12/2006 | Chaddha et al. |
| 2007/0011331 A1 | 1/2007 | Morimoto et al. |
| 2007/0027734 A1 | 2/2007 | Hughes |
| 2007/0038490 A1 | 2/2007 | Joodi |

(56) References Cited

U.S. PATENT DOCUMENTS

| | | | |
|---|---|---|---|
| 2007/0038492 | A1 | 2/2007 | Ryan et al. |
| 2007/0061385 | A1 | 3/2007 | Clark et al. |
| 2007/0067296 | A1 | 3/2007 | Malloy et al. |
| 2007/0079097 | A1 | 4/2007 | Karnowski et al. |
| 2007/0100712 | A1 | 5/2007 | Kilpatrick et al. |
| 2007/0112847 | A1 | 5/2007 | Dublish et al. |
| 2007/0143166 | A1 | 6/2007 | Leymann et al. |
| 2007/0150571 | A1 | 6/2007 | Haga et al. |
| 2007/0165525 | A1 | 7/2007 | Kageyama |
| 2007/0179826 | A1 | 8/2007 | Cutlip et al. |
| 2007/0198678 | A1 | 8/2007 | Dieberger et al. |
| 2007/0198789 | A1 | 8/2007 | Clark et al. |
| 2007/0234408 | A1 | 10/2007 | Burch et al. |
| 2007/0266029 | A1 | 11/2007 | Baskey et al. |
| 2007/0271219 | A1 | 11/2007 | Agarwal et al. |
| 2007/0276885 | A1 | 11/2007 | Valiyaparambil et al. |
| 2007/0286219 | A1 | 12/2007 | Knop et al. |
| 2007/0294406 | A1 | 12/2007 | Suer et al. |
| 2007/0300204 | A1 | 12/2007 | Andreev et al. |
| 2008/0005739 | A1 | 1/2008 | Sadiq et al. |
| 2008/0016335 | A1 | 1/2008 | Takahashi et al. |
| 2008/0052719 | A1 | 2/2008 | Briscoe et al. |
| 2008/0063423 | A1 | 3/2008 | Matoba |
| 2008/0140495 | A1 | 6/2008 | Bhamidipaty et al. |
| 2008/0147452 | A1 | 6/2008 | Renz et al. |
| 2008/0215909 | A1 | 9/2008 | Bretschneider et al. |
| 2008/0294777 | A1 | 11/2008 | Karve et al. |
| 2008/0295100 | A1 | 11/2008 | Ainsworth |
| 2008/0317217 | A1 | 12/2008 | Bernardini et al. |
| 2009/0037363 | A1 | 2/2009 | Kozlov et al. |
| 2009/0077210 | A1 | 3/2009 | Musman et al. |
| 2009/0113383 | A1 | 4/2009 | Delima et al. |
| 2009/0125751 | A1 | 5/2009 | Dawson et al. |
| 2009/0150456 | A1 | 6/2009 | Balasubramanian et al. |
| 2009/0150887 | A1 | 6/2009 | Sanghvi et al. |
| 2009/0171703 | A1 | 7/2009 | Bobak et al. |
| 2009/0171704 | A1 | 7/2009 | Bobak et al. |
| 2009/0171705 | A1 | 7/2009 | Bobak et al. |
| 2009/0171706 | A1 | 7/2009 | Bobak et al. |
| 2009/0171707 | A1 | 7/2009 | Bobak et al. |
| 2009/0171708 | A1 | 7/2009 | Bobak et al. |
| 2009/0171730 | A1 | 7/2009 | Bobak et al. |
| 2009/0171731 | A1 | 7/2009 | Bobak et al. |
| 2009/0171732 | A1 | 7/2009 | Bobak et al. |
| 2009/0171733 | A1 | 7/2009 | Bobak et al. |
| 2009/0172149 | A1 | 7/2009 | Bobak et al. |
| 2009/0172461 | A1 | 7/2009 | Bobak et al. |
| 2009/0172470 | A1 | 7/2009 | Bobak et al. |
| 2009/0172668 | A1 | 7/2009 | Bobak et al. |
| 2009/0172669 | A1 | 7/2009 | Bobak et al. |
| 2009/0172670 | A1 | 7/2009 | Bobak et al. |
| 2009/0172671 | A1 | 7/2009 | Bobak et al. |
| 2009/0172674 | A1 | 7/2009 | Bobak et al. |
| 2009/0172682 | A1 | 7/2009 | Bobak et al. |
| 2009/0172687 | A1 | 7/2009 | Bobak et al. |
| 2009/0172688 | A1 | 7/2009 | Bobak et al. |
| 2009/0172689 | A1 | 7/2009 | Bobak et al. |
| 2009/0172769 | A1 | 7/2009 | Bobak et al. |
| 2009/0249337 | A1 | 10/2009 | Vasilevsky et al. |
| 2010/0280863 | A1 | 11/2010 | Wilcock et al. |
| 2011/0004564 | A1 | 1/2011 | Rolia et al. |

OTHER PUBLICATIONS

"Factor Analysis Using SAS PROC Factor", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: Volume I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—Volume II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL, printed Mar. 3, 2009.
Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Office Action for U.S. Appl. No. 11/965,855 dated Apr. 30, 2010.
Final Office Action for U.S. Appl. No. 11/966,495 dated May 14, 2010.
Final Office Action for U.S. Appl. No. 11/966,495 dated Jun. 14, 2010.
Office Action for U.S. Appl. No. 11/965,872 dated Jul. 6, 2010.
"Parasoft BPEL Maestro," http://www/parasoft.com/jsp/products/home.jsp?product_BPEL, Nov. 6, 2008.
"BPEL Project," http://www.eclipse.org/bpel/, 2008.
"Factor Analysis Using SAS PROC Factor," http://www.utexas.edu/cc/docs/stat53.html, Jun. 25, 1995.
"Principal Components and Factor Analysis," http://statsoft.com/textbook/stfacan/html, 1984.
"WebSphere Integration Developer," http://www-306.ibm.com/software/integration/wid/about/?S_CMP=rnav, 2008.
Final Office Action for U.S. Appl. No. 11/965,897 dated Sep. 17, 2010.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (cited by Examiner in Office Action for U.S. Appl. No. 11/965,926—no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339 (cited by Examiner in Office Action for U.S. Appl. No. 11/965,845—no further date information available.).
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Final Office Action for U.S. Appl. No. 11/965,930 dated Sep. 29, 2010.

(56) References Cited

OTHER PUBLICATIONS

Final Office Action for U.S. Appl. No. 11/965,874 dated Oct. 14, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,917 dated Jul. 11, 2011.
Final Office Action for U.S. Appl. No. 11/965,926 dated Jul. 19, 2011.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford et al., "Toward an on Demand Service-Oriented Architecture," IBM Systems Journal, vol. 44, No. 1, 2005.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,894 dated Oct. 23, 2012.
Office Action for U.S. Appl. No. 11/965,902 dated Nov. 16, 2012.
Final Office Action for U.S. Appl. No. 11/965,889 dated Jan. 11, 2013, pp. 1-15.
Final Office Action for U.S. Appl. No. 11/965,899 dated Jan. 29, 2013, pp. 1-17.
Office Action for U.S. Appl. No. 11/965,838 dated Apr. 30, 2013, pp. 1-30.
Office Action for U.S. Appl. No. 11/965,894 dated May 8, 2013, pp. 1-9.
Final Office Action for U.S. Appl. No. 11/965,838 dated Aug. 9, 2013, pp. 1-19.
Office Action for U.S. Appl. No. 11/965,845 dated Aug. 13, 2013, pp. 1-46.
Office Action for U.S. Appl. No. 11/9654,926 dated Aug. 14, 2013, pp. 1-29.
Office Action for U.S. Appl. No. 11/965,922 dated Aug. 14, 2013, pp. 1-35.
Office Action for U.S. Appl. No. 11/965,899 dated Aug. 28, 2013, pp. 1-20.
Notice of Allowance for U.S. Appl. No. 11/965,917 dated Aug. 28, 2013, pp. 1-25.
Notice of Allowance for U.S. Appl. No. 11/965,894 dated Nov. 7, 2013, pp. 1-16.
Final Office Action for U.S. Appl. No. 11/965,922 dated Dec. 27, 2013, pp. 1-65.
Charfi, Anis and Mira Mezini, "Aspect-Oriented Workflow Languages," Oct. 2006, pp. 183-200.
Charfi, Anis and Mira Mezini, "Aspect-Oriented Web Service Composition with AO4BPEL," 2004 (no further date information available), pp. 168-182.
Lassen, Kristian Bisgaard and Wil M.P. van der Aalst, "WorktlowNet2BPEL4WS: A Tool for Translating Unstructured Workflow Processes to Readable BPEL," Oct. 2006, pp. 127-144.
Karastoyanova, Dimka et al., "Extending BPEL for Run Time Adaptability," Sep. 2005, pp. 15-26.
Mayer, Philip and Daniel Lubke, "Towards a BPEL Unit Testing Framework," Jul. 2006, pp. 33-42.
Notice of Allowance for U.S. Appl. No. 11/965,926 dated Dec. 31, 2013, pp. 1-28.
Notice of Allowance for U.S. Appl. No. 11/965,845 dated Dec. 31, 2013, pp. 1-28.
Notice of Allowance for U.S. Appl. No. 12/975,520 dated Jan. 17, 2014, pp. 1-19.

* cited by examiner

FIG. 6A

EVENT LOG

| MESSAGE | RESOURCE | DATE |
|---|---|---|
| ! CONTAINMENT REGION HAS RECOVERED | CONTAINMENT1 | APR 18, 2006 10:50:52.193 |
| X CONTAINMENT REGION CREATED FOR RESOURCE FAILURE | CONTAINMENT1 | APR 18, 2006 10:50:52.103 |
| ! CONTAINMENT REGION HAS RECOVERED | CONTAINMENT3 | APR 18, 2006 10:50:51.982 |
| X DETECTED DYNAMIC MEMBERSHIP CHANGE: ACTIVE POLICY RECD... | RECOVERYSEGMENT2 | APR 18, 2006 10:12:25.696 |
| X THIS RESOURCE HAS ENTERED AN UNRECOVERABLE STATE AND RED... | RECOVERY MANAGER2 | APR 18, 2006 10:12:25.696 |
| X THIS RESOURCE HAS ENTERED AN UNRECOVERABLE STATE AND RED... | RECOVERY MANAGER1 | APR 18, 2006 10:12:14.770 |
| X ACTIVATION OF POLICY "XYZ" HAS FAILED | RECOVERY SEGMENT1 | APR 18, 2006 10:12:14.760 |
| ! DETECTED DYNAMIC MEMBERSHIP CHANGE ACTIVE POLICY RECD | RECOVERY SEGMENT2 | APR 18, 2006 10:10:25.696 |

? THE RESOURCE "CODER 1 RECOVERY" HAS ENTERED AN UNRECOVERABLE STATE THAT REQUIRES YOUR INPUT. DO YOU WANT TO OPEN THE RESOURCE NOW?

[YES] [NO]

650

912

RECOVERY_SEGMENT

RS_ID: INTEGER

DISPLAY_NAME: VARCHAR(96)
RESOURCE_ID: CHAR(32)
ADMIN_STATE: INTEGER
RUNTIME_STATE: INTEGER
OPERATION_MODE: CHAR(1)
STATE_QUERY_COUNT: INTEGER
STATE_QUERY_TIME_AVG: INTEGER
STATE_QUERY_TIME-STDV: INTEGER
RES_MANAGED_COUNT: INTEGER
SUMMARY_STATE: INTEGER
CURRENT_PSE_ID: INTEGER
CURRENT_POLICY_ID: INTEGER
CURRENT_TOPOLOGY_ID: INTEGER
CHANGED_POLICY_ID: INTEGER
CHANGED_TOPOLOGY_ID: INTEGER
TOPOLOGY_CHANGES_POLICY_ID: INTEGER
OBSERVATION_MODE: CHAR(1)
OBSERVATION_TOKEN: INTEGER
PERIODIC_POLL_INTERVAL: INTEGER
OBSERVATION_BATCH_COUNT: INTEGER
OBSERVATION_TOTAL_POLLS: INTEGER
OBSERVATION_POLL_RESP_PCT: INTEGER
OBSERVATION_RES_COUNT: INTEGER
PER_OBSERVATION_REQ_COUNT: INTEGER
PER_OBSERVATION_RESP_COUNT: INTEGER
PER_OBSERVATION_RES_RESPONSE: INTEGER
PER_OBSERVATION_ACCUM_TIME: INTEGER
RS_TT_ID: INTEGER
MONITORING_BRM_ID: INTEGER
THRESHOLD_MIN_OBSERVATION_CNT: INTEGER
THRESHOLD_MAX_STDV: INTEGER
THRESHOLD_CONFIDENCE_INTERVAL: INTEGER
USE_FIXED_ALGORITHM: CHAR(1)
USE_DYNAMIC_ALGORITHM: CHAR(1)
USE_CUSTOMER_ALGORITHM: CHAR(1)
DEPLOYMENT_INFO_ID: INTEGER
TS_UPDATE: TIMESTAMP

DEFINING A COMPUTER RECOVERY PROCESS THAT MATCHES THE SCOPE OF OUTAGE INCLUDING DETERMINING A ROOT CAUSE AND PERFORMING ESCALATED RECOVERY OPERATIONS

TECHNICAL FIELD

This invention relates, in general, to managing customer environments to provide support for business resiliency, and in particular, to managing recovery processing within an environment.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the hand-crafted recovery scheme.

SUMMARY OF THE INVENTION

Based on the foregoing, a need exists for a capability to facilitate management of an IT environment. In particular, a need exists for a capability to facilitate recovery processing within the environment. As one example, a need exists for a technique that programmatically defines a recovery process that matches the scope of outage.

The shortcomings of the prior art are overcome and additional advantages are provided through the provision of a computer-implemented method of facilitating recovery in an Information Technology (IT) environment. The method includes, for instance, programmatically analyzing information relating to a failure within the IT environment, the information being related to at least one of one or more resources impacted by the failure, one or more implications of the failure, or one or more resources degraded by the failure; and programmatically determining a set of resources to be recovered based on the analyzed information, said set of resources being commensurate with a scope of the failure.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

FIGS. 9A-9B depict one example of a workflow table and related tables used in accordance with an aspect of the present invention;

DETAILED DESCRIPTION OF THE INVENTION

Figure 1:
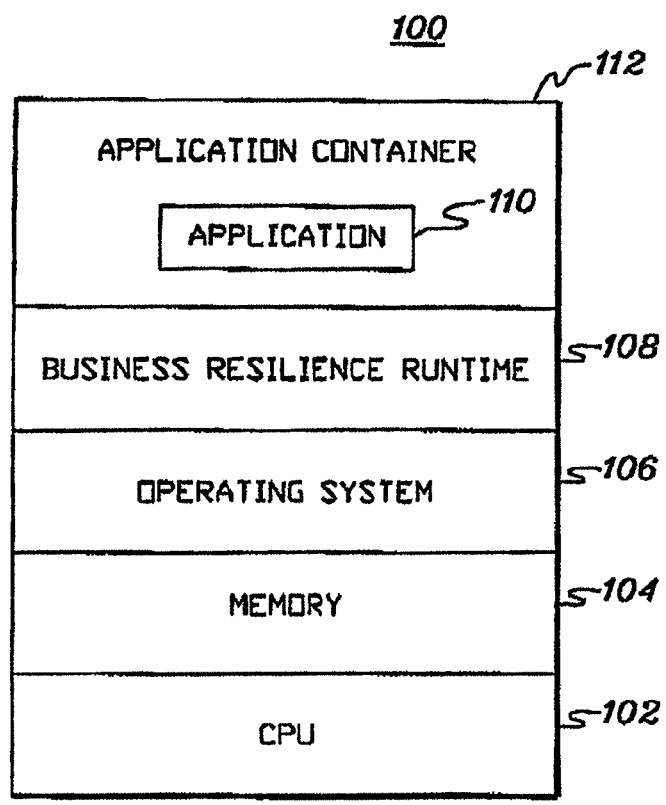
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are preconfigured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved.

Ensure that both automated and non-automated tasks can be incorporated into the pre-conditioning. Example of customer question: What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
    Correlation and identification of dependencies between business functions and the supporting IT resources.
    Impact analysis of failures affecting business functions, across resources used within the business functions, including the applications and data.
    Isolation of failure scope to smallest set of resources, to ensure that any disruptive recovery actions effect only the necessary resources.
2. Rapid granular and graceful degradation of IT service.
    Discontinuation of services based on business priorities.
    Selection of alternate resources at various levels may include selection of hardware, application software, data, etc.
    Notifications to allow applications to tailor or reduce service consumption during times of availability constraints.
3. Integration of availability management with normal business operations and other core business processes.
    Policy controls for availability and planned reconfiguration, aligned with business objectives.
    Encapsulation, integration of isolated point solutions into availability IT fabric, through identification of affected resources and operations initiated by the solutions, as well as business resiliency.
    Goal based policy support, associated with Recovery Segments that may be overlapped or nested in scope.
    Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.

5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
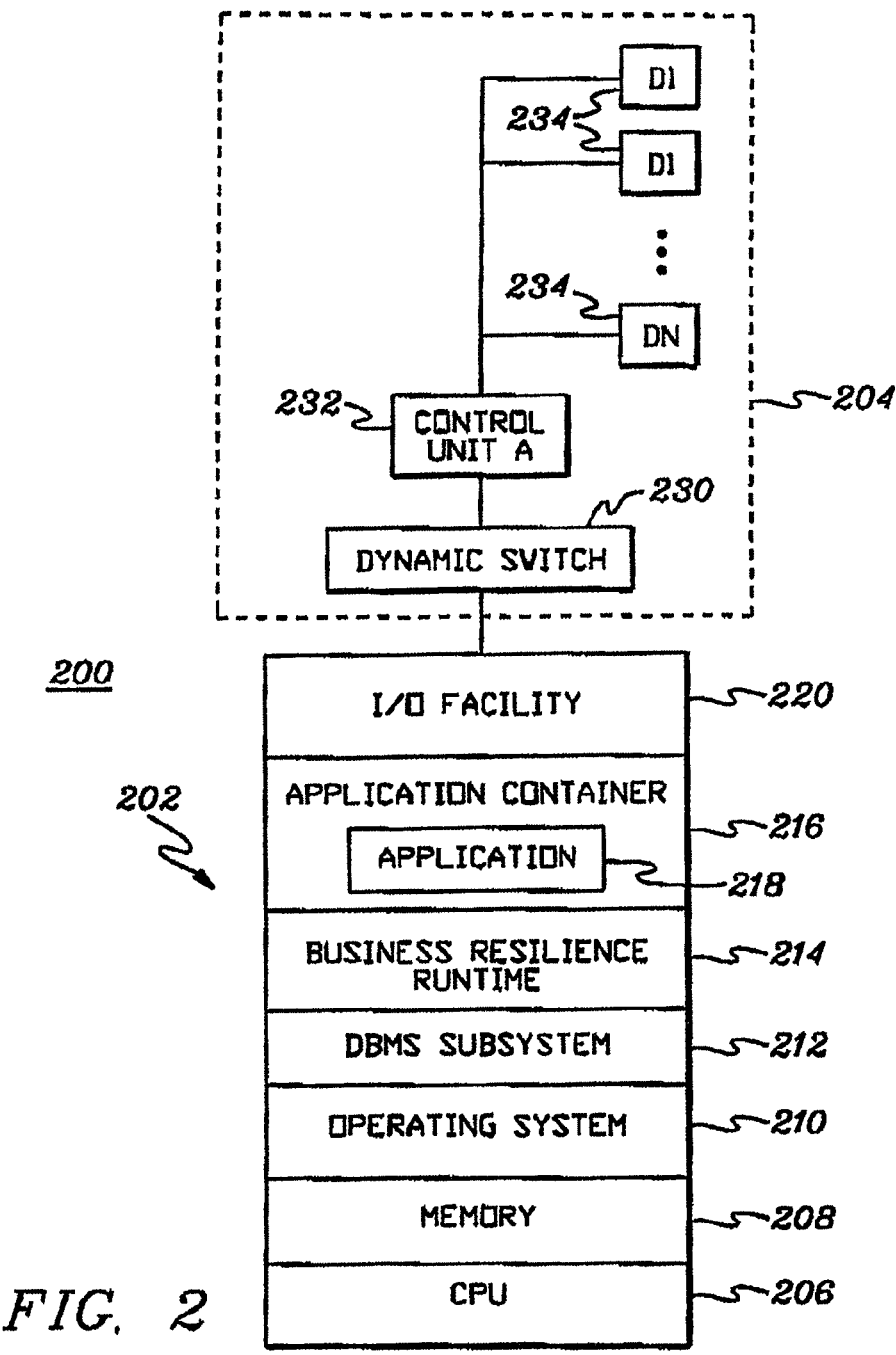
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
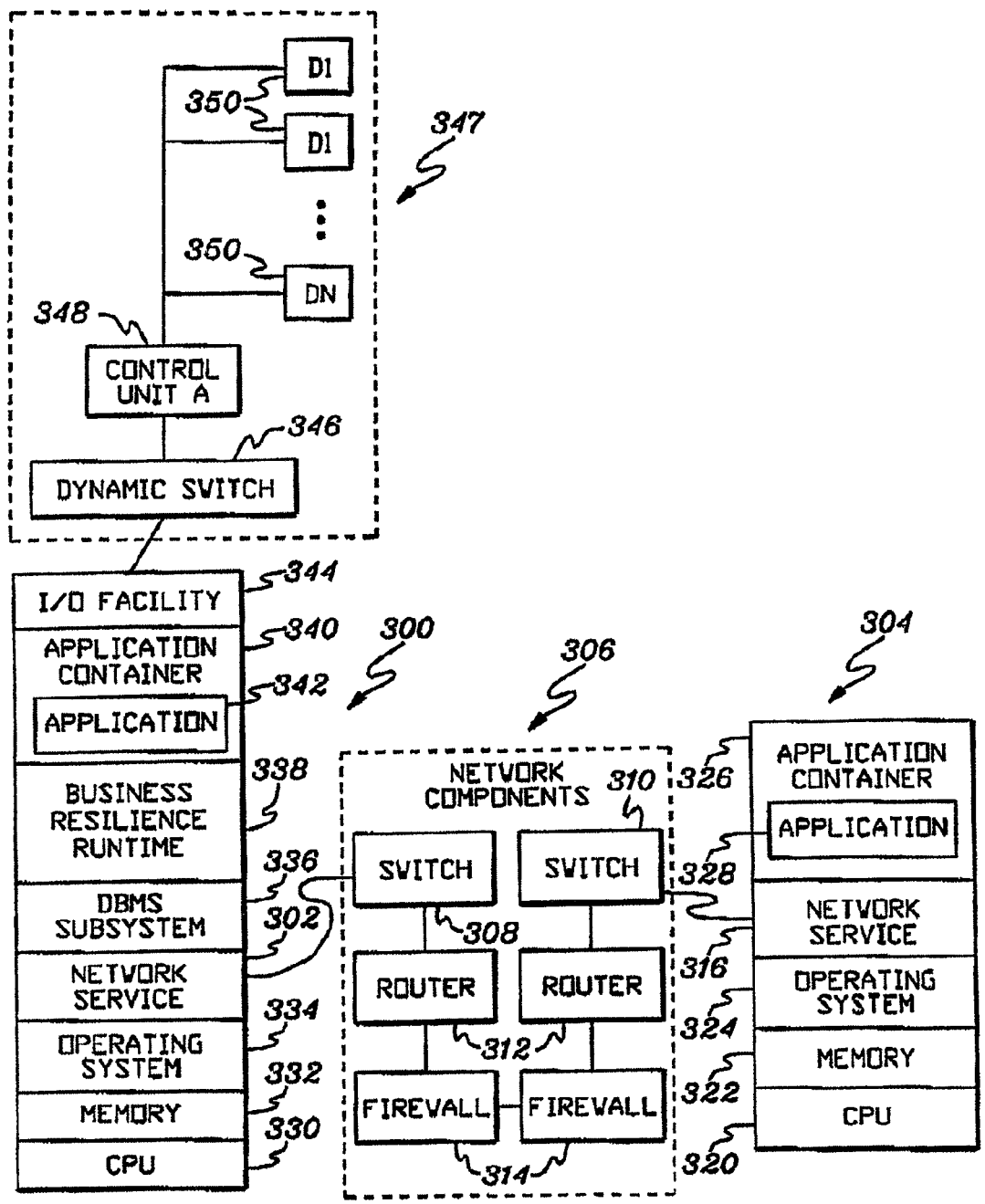
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences.

The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment.

Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures.

Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
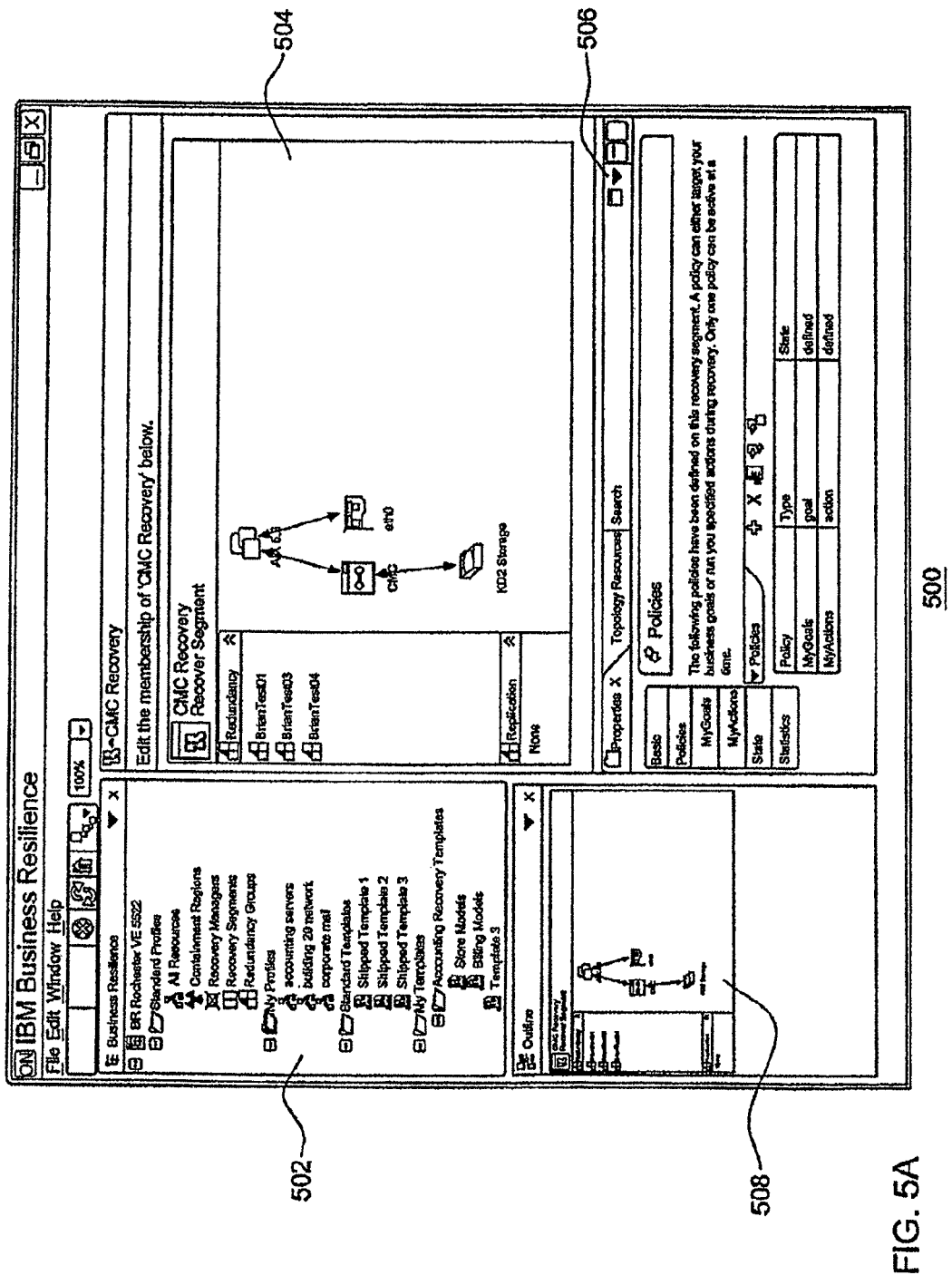
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
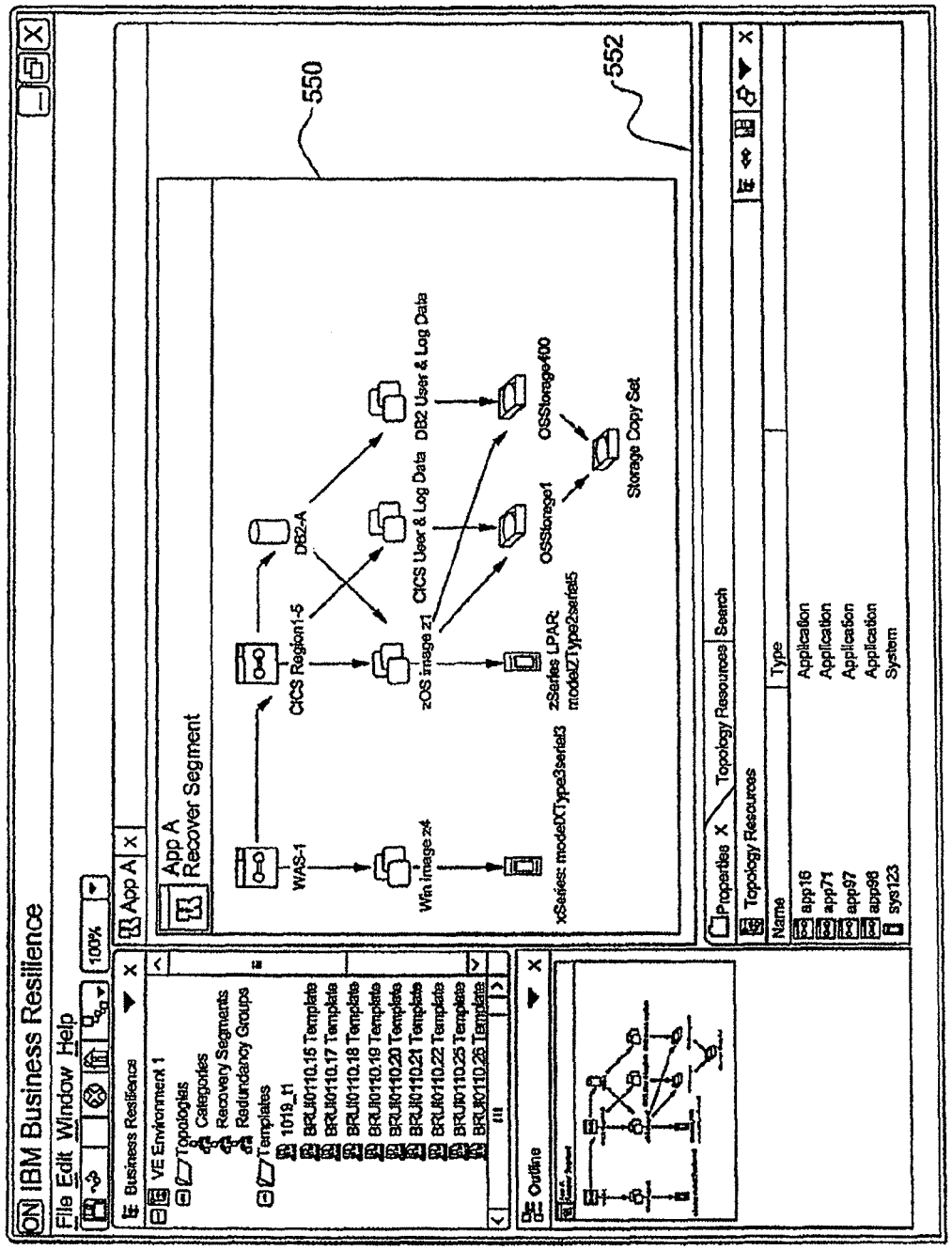
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
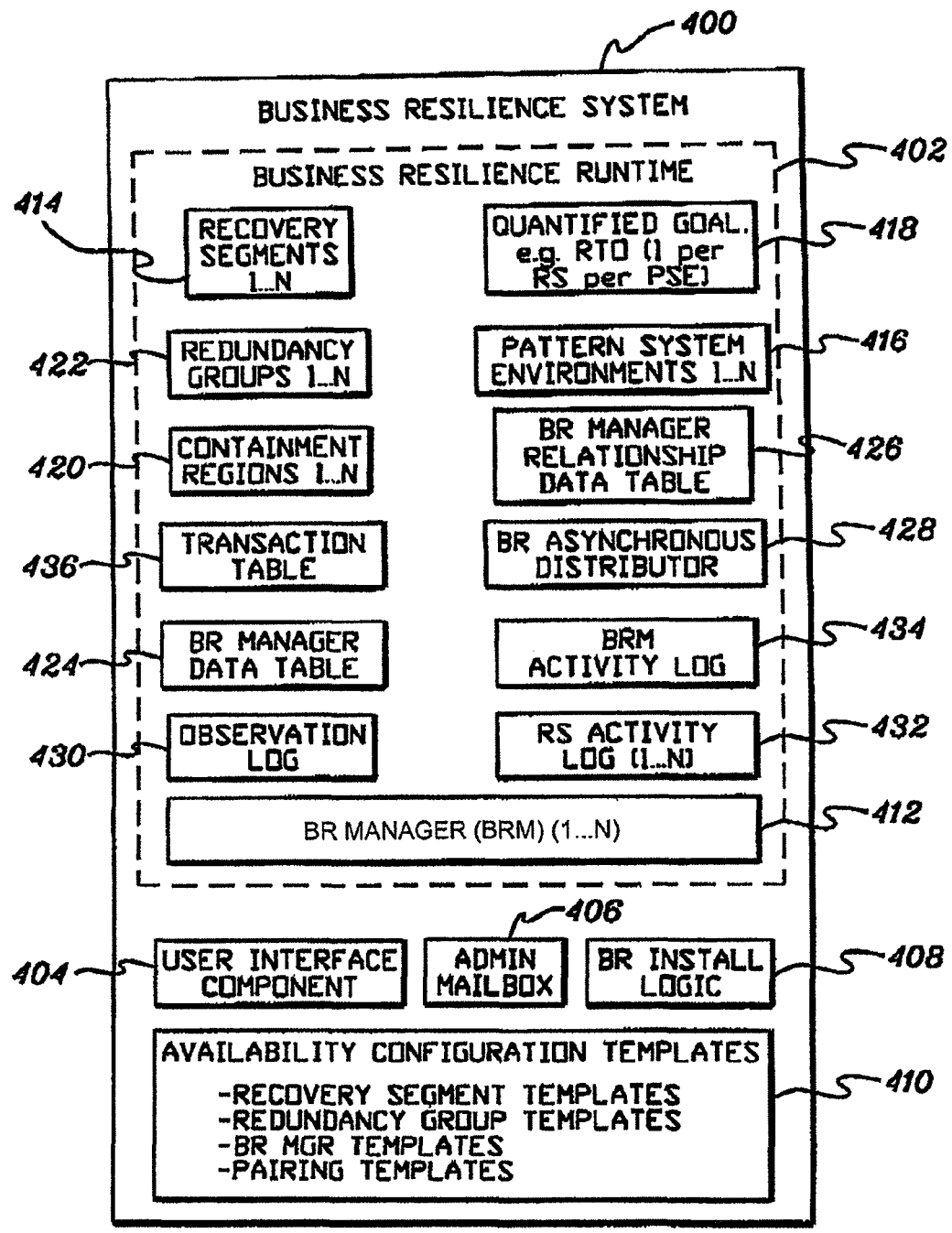
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
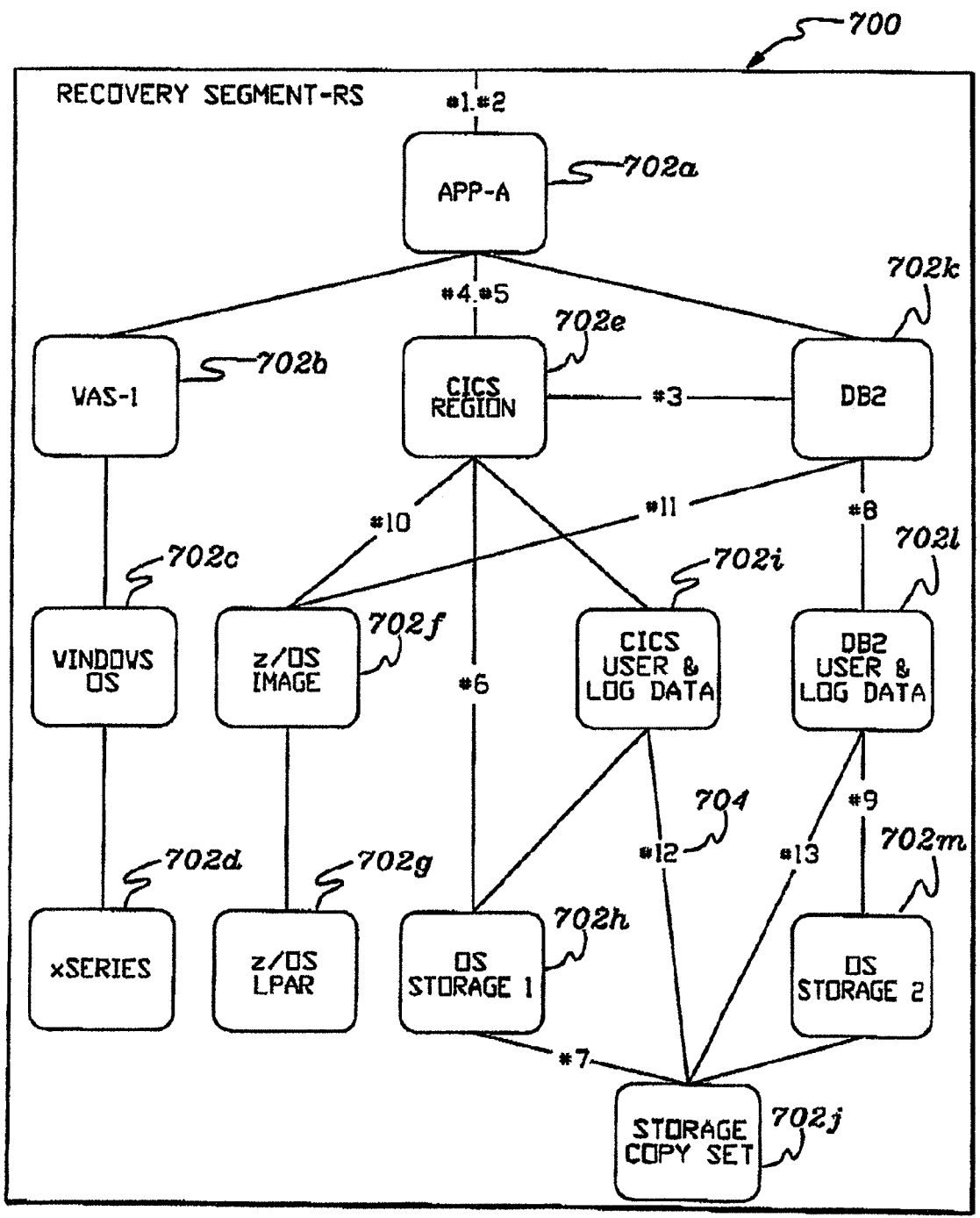
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702h fails (goes Unavailable).
RS gets notified of state change event.
$1^{st}$ level state aggregation determines:
    Storage Copy Set→Degraded
    CICS User & Log Data→Degraded
    DB2 User & Log Data→Degraded
    DB2→Degraded
    CICS→Unavailable
    App-A→Unavailable
$1^{st}$ level state aggregation determines:
    RS→Unavailable
BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—
Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—
Steps taken as a result of fault detection during runtime monitoring of the environment, such as, for example, restarting a failed operating system (OS). BR generates recovery workflows dynamically, in one example, based on the actual failure rather than a prespecified sequence.

Preventive—
Steps taken to contain or fence an error condition and prevent the situation from escalating to a more substantial outage or impact; for example, the severing of a failed resource's relationship instances to other resources. Preventive workflows are also dynamically generated, in one example.

Return—
Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=may
http://www.eclipse.org/bpel/
http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:
  Align total IT runtime environment to business function availability objectives:
    RS definition from representation of IT Resources;
    Goal (RTO) and action policy specification, validation and activation; and
    Tooling by Eclipse, as an example, to integrate with IT process management.
  Rapid, flexible, administrative level:
    Alteration of operation escalation rules;
    Customization of workflows for preparatory and recovery to customer goals;
    Customization of IT resource selection from RG based on quality of service (QoS);
    Alteration of definition of IT resource and business application state (available, degraded, or unavailable);
    Customization of aggregated state;
    Modification of topology for RS and RG definition;
    Selection of BR deployment configuration;
    Alteration of IT resource recovery metrics;
    Customization of generated Pattern System Environments; and
    Specification of statistical tolerances required for system environment formation or recovery metric usage.
  Extensible framework for customer and vendor resources:
    IT resource definitions not specific to BR System; and
    Industry standard specification of workflows, using, for instance, BPEL standards.
  Adaptive to configuration changes and optimization:
    IT resource lifecycle and relationships dynamically maintained;
    System event infrastructure utilized for linkage of IT resource and BR management;
    IT resource recovery metrics identified and collected;
    IT resource recovery metrics used in forming Pattern System Environments;
    Learned recovery process effectiveness applied to successive recovery events;
    System provided measurement of eventing infrastructure timing;
    Dynamic formation of time intervals for aggregation of related availability events to a root cause; and
    Distribution of achieved recovery time over constituent resources.
  Incremental adoption and coexistence with other availability offerings:
    Potential conflict of multiple managers for a resource based on IT representation;
    Workflows for recovery and preparatory reflect operations with meta data linked to existing operations;
    Advisory mode execution for preparatory and recovery workflows; and
    Incremental inclusion of resources of multiple types.
  Support for resource sharing:
    Overlapping and contained RS;
    Merger of CR across RS and escalation of failure scope; and
    Preparatory and recovery workflows built to stringency requirements over multiple RS.
  Extensible formalization of best practices based on industry standards:
    Templates and patterns for RS and RG definition;
    Preparatory and recovery workflows (e.g., BPEL) for customization, adoption; and
    Industry standard workflow specifications enabling integration across customer and multiple vendors.
  Integration of business resilience with normal runtime operations and IT process automation:
    Option to base on IT system wide, open industry standard representation of resources;
    BR infrastructure used for localized recovery within a system, cluster and across sites; and
    Utilization of common system infrastructure for events, resource discovery, workflow processing, visualization.

Management of the IT environment is adaptively performed, as described herein and in a U.S. Patent Application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. Patent Applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al, which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), Bobak et al., which is hereby incorporated herein by reference in its entirety.

With the outage scoped and current resource state evaluated, the BR environment can formulate an optimized recovery set of operations to meet the availability goal, as described herein, in accordance with one or more aspects of the present invention.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (POU920070106US1), Bobak et al., which is hereby incorporated herein by reference in its entirety.

Use of provided templates representing best practices in defining the BR system, as described in "Defining and Using Templates in Configuring Information Technology Environments," (POU920070109US1), Bobak et al., which is hereby incorporated herein by reference in its entirety.

Use of provided templates in formulation of workflows, as described in "Using Templates in a Computing Environment," (POU920070126US1), Bobak et al., which is hereby incorporated herein by reference in its entirety.

Making changes to the availability goals while supporting ongoing BR operation, as described in "Non-Disruptively Changing a Computing Environment,"

(POU920070122US1), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.

Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and | Complex |

| Resource Type | Property | Value Range |
| --- | --- | --- |
| | delays | |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |

-continued

| Resource Type | Property | Value Range |
|---|---|---|
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, |

| Resource Type | Property | Value Range |
|---|---|---|
| | Open status | nonoperational/disabled Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
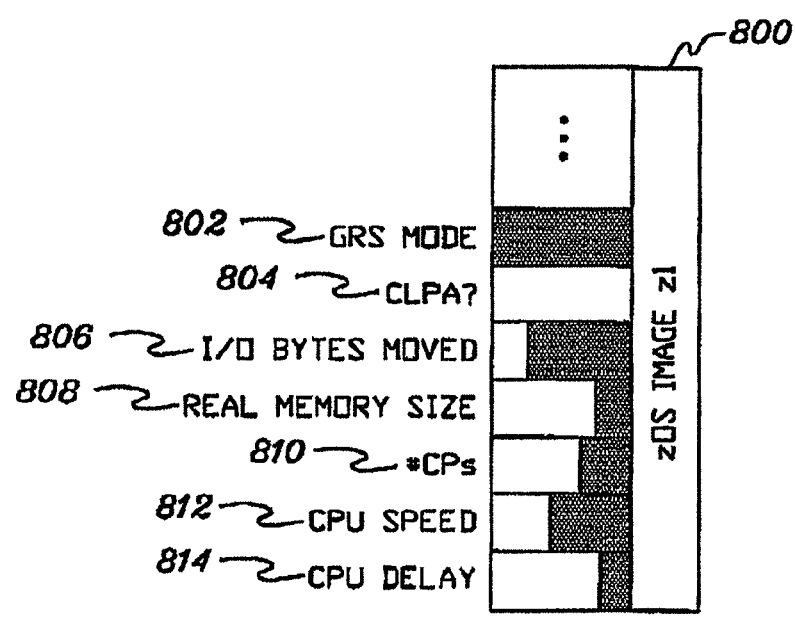
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
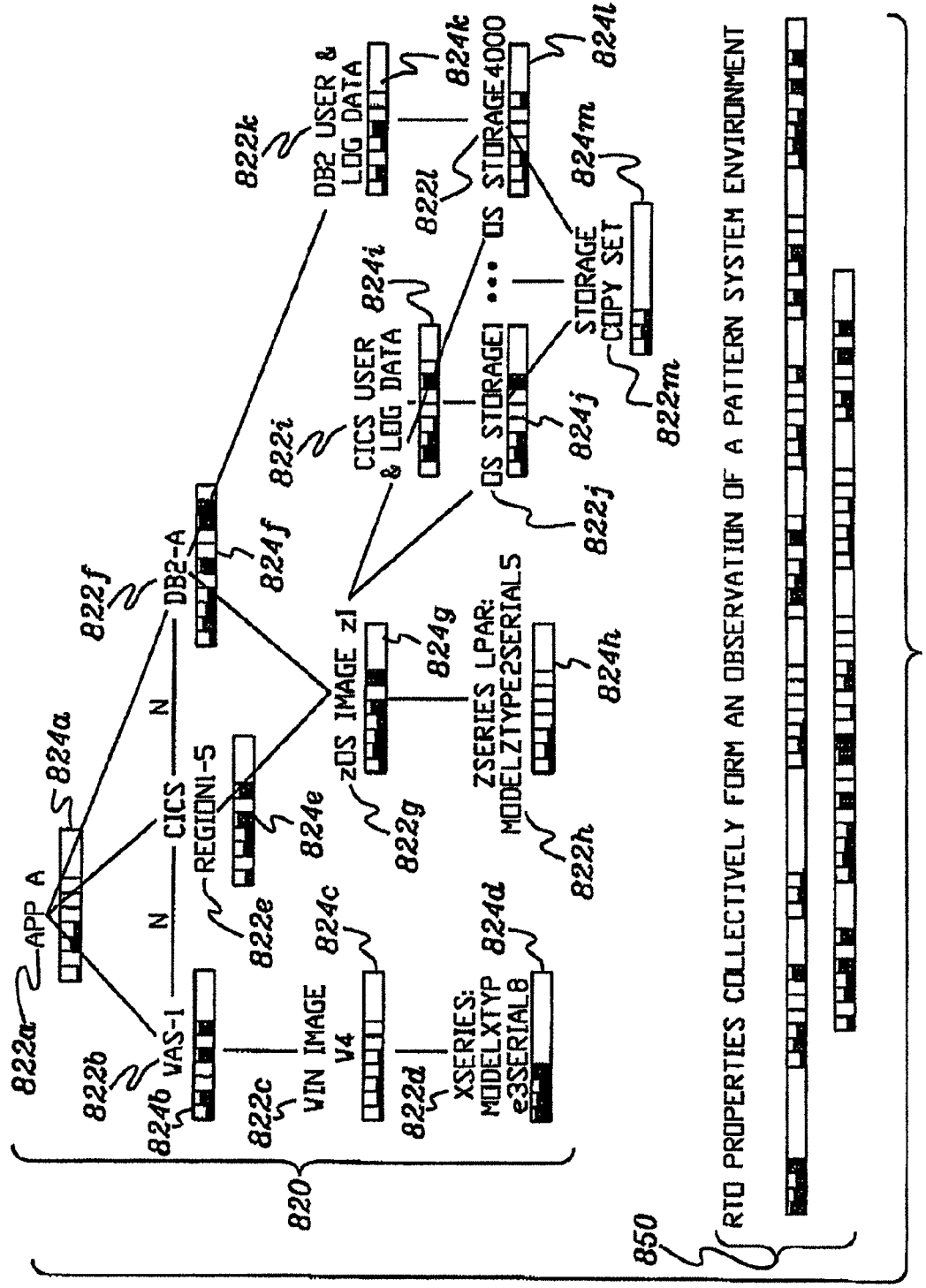
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |

| | |
|---|---|
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.

Are present to understand impacts on managed resources.

No decomposed RTO is associated with an assessed resource.

They are resources on which resources managed by BR depend upon, but are not directly acted on for availability by BR.

They are resources removed (or not explicitly added) from the actively monitored set of resources by the BR admin during RS definition.

They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:
- They have an entry in the BRMD, depending on their use, and the BRMD entry has an indication of assessed vs. managed.
- The RS subscribes to state change notifications for assessed resources (and possibly other notifiable properties).
- Relationships between observed and managed resources are possible (and likely).
- BR monitors for lifecycle events on assessed resources in the same manner as for managed resources.
- Assessed resources can be added and/or removed from Recovery Segments.
- They can be used to contribute to the aggregated state of an RS.

Finally, there are a few restrictions that BR imposes upon assessed resources, in this embodiment:
- Again, BR does not invoke any workflow operations on assessed resources.
- A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:
- To perform statistical analysis from the BR UI to form characterizations of customers' normal execution environments, represented in BR as Pattern System Environments (PSE).
- To classify operations on resources into these PSEs for purposes of determining operation execution duration.
- Help determine approximate path length of operations that are pushed down from BR to the resources, and possibly to the underlying instrumentation of each resource.
- Help determine approximate path length of activities executed within BPEL workflows.
- Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:
1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.
2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:
1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:
1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, a recovery process is defined that matches the scope of failure or outage. An analysis of the resources that have been impacted, of implications of the failure and of degradations that have occurred is performed to programmatically (i.e., not manually) construct a recovery process of appropriate level (not too much recovery, nor too little). The recovery process includes the recovery of those resources causing or impacted by the failure. The recovery operations to be performed are selected based on the current state of the environment.

Business Resilience has typically been accomplished by detection of a single error, and taking a predefined action on the resource(s) surfacing an error, potentially to move the resource to a preconfigured target. For example, in most automation type systems, the responses and actions to events detected are specified ahead of time, and dynamic variations in conditions at time of recovery or variations in requirements of one business application on another are not considered in creating the recovery plan. The problems with today's solutions include:

- Static environment that cannot adapt the recovery plan to the scope of an outage.
- Recovery actions impact resources that are not otherwise impacted due to inflexible structure.
- Inability to take into account selection of recovery targets based on availability of the alternate hosting environments.
- Adding in additional resources to be managed and additional recovery is manually configured and difficult to maintain.
- No use of past histories in determining when operations have been attempted and failed, and need to escalate to other operations.
- No assessment of related resource failures or degradations in determining appropriate recovery plan.
- No evaluation of the recovery sequence to account for failures in steps.
- No projection of impact recovery operations will have on business applications.
- No means of recognizing dependent operations.
- Only means for ordering operations within a recovery sequence is through statically defined, preconfigured scripts that cannot adjust for failures.
- Limited means to configure actions in parallel for optimized recovery time.
- No means for dynamic construction of operations, their ordering, or parallelization tailored to the specific resource failure scope.
- No means for visual rendering of dynamically composed recovery plan.

The above-described deficiencies are addressed by one or more aspects of the present invention that adapt recovery of an environment, e.g., an IT environment supporting business resiliency, to the scope of failure, and that ensure that the recovery impacts only those resources necessary to achieve the customer's goals, such as business availability targets specified by Recovery Time Objective policies on Recovery Segments.

The following items are included, in one implementation:
1. Use of the failed and degraded resource states based on pairings.
2. Assessment of operations to address non-responsive resources.
3. Assessment of operations to recover failed resources.
4. Assessment of actions to recover degraded resources.
5. Determining escalation to alternate operations when initial operations fail.
6. Ordering of operations dynamically considered in creating recovery process.
7. Parallelization of operations for achieving optimal recovery time.
8. Using assessment, ordering, and parallelization techniques to limit effect to scope of outage.
9. Determination of what impact recovery actions have on business applications.
10. Determination of targets for resources which need to be moved.
11. Visualization capability for the generated recovery plan.
12. Ability to adjust recovery flow for new resources/relationships.

Use of the Failed and Degraded Resource States

The Business Resiliency (BR) solution makes an active assessment of the cause of the failure determined by the states of resources and their relationships. In one implementation, the collection of resources under evaluation for a given outage may be determined as described in a co-filed, U.S. Patent application entitled "Facilitating Identification of Resources Affected By An Event," Bobak et al., (POU920070118US1). In another implementation, outage events occurring within a specified time period may be aggregated for evaluation.

This information designates resources as either failed or degraded, and further may indicate what resource degradation or failure caused the resource to appear in the affected resource list. Recovery processing limits the scope of failure to the smallest subset of resources that are either directly failed, failed due to association with another failed/degraded resource, or degraded due to association with another failed/degraded resource. This isolation of scope enables only those resource actually affected by an outage to be considered for action, and the actions have as minimal impact as possible to recover the failed resources.

The recovery process described below is iterative with each iteration targeting a subset of the total collection of resources under evaluation for an outage. The first phase of processing determines what may be done to resolve the state of non-responsive resources. In each successive iteration, the relationships among resources under evaluation are used to determine the fundamental cause of the outage. Each iteration selects a set of one or more recovery operations. Success or failure of those operations are evaluated before the next iteration. Current resource state is requested before each iteration of recovery processing execution in order to establish the effects of the previous iteration of recovery operations. Failed recovery operations are removed from the candidate list of operations for recovery in successive iterations of recovery processing.

Assessment of Non-Responsive Resources

Relationships among resources are evaluated in determining the scope of an outage. Resources which depend on failed or degraded resources are queried to provide current state. Resources, which if failed or degraded may cause a failed or degraded state in a resource reporting an outage, are queried to provide current state. In requesting current state from the collection of resources under evaluation for an outage, there may fail to be a response. If non-responsive resources are encountered in forming the recovery process, a first phase evaluation is undertaken to determine if there are operations which may be invoked to resolve the non-responsive state of resources. On completion of non-responsive resource evaluation, selection of operations for failed and degraded resources is initiated.

Assessment of Operations to Recover Failed and Degraded Resources

Failed and degraded resources are evaluated using pairing information for operation effect. In one example, a DAG of resources under evaluation for the current outage is formed. The one or more DAG(s) are then processed from the root to leaf nodes. Along each branch of the DAG, the first occurrence of a failed or degraded resource results in operation selection for the current iteration of recovery processing.

Each failed or degraded resource, whether directly reported as failed or whether failed due to an implication from a related resource, is assessed to determine a next recovery operation. A set of candidate recovery operations is constructed from various sources. First, the failed resources are assessed to determine which operation on the failed resource itself transitions the resource to the desired state. Next, the set of all operations on any resource that can transition the failed resource to the desired state is included. Subsequently, any operation on the resource itself related to its recovery is considered. These sets are unioned together. Failed operations are removed from the unioned set.

The technique determines if the optimal recovery operation for this resource (based on recovery time) is part of the unioned set. This optimal recovery time operation was determined at the time the environment was conditioned for recovery. In one implementation, such conditioning may be achieved through preparatory time processing, as described in a co-filed, U.S. Patent Application, entitled "Means for Defining and Validating Achievability of Business Application Availability Goal," Bobak et al., (POU920070111US1). If the optimal recovery time operation is found, that one is chosen; however, due to environmental conditions, or previous failures, the optimal recovery time option may not be a possibility. If that is not a possibility, then one of the unioned sets is chosen based on which operation(s) will achieve the desired state. Associated with each operation there may exist an ordering. Ordering of operations may be provided from the vendor of the resource or by the customer. The ordering of operations is stored in a Vorder field of an operations table by the BR system. The Vorder field includes the vendor specified ordering. By default, the BR system copies the Vorder field to the Order field of the operations table as the current ordering preference. Customers may change the Order of operations through the BR UI. Of the operations which may achieve the desired state, those with the lowest Order are selected. If there are multiple operations of a given order, then of those, the one which has the lowest operation execution time is selected. Note this techniques makes use of operation execution times for the individual resources. In one implementation, the process of obtaining those programmatically may be performed as described in a co-filed U.S. Patent Application, entitled "Pattern System Environment Supporting Business Resilience," Bobak et al. (POU920070107US1). Alternatively, a list of operations and their associated execution times may be provided by the customer directly.

Using Current Environmental Conditions to Determine Operations for Inclusion

In typical availability or disaster recovery products, the current state of the system and environment is not considered in determining which resource operations to include or when to escalate to a next (more severe) operation in recovery. In one implementation, the resource pairings, and specifically, the feature related to triggers for current operating state, may be used to determine the operations to be included for recovering a given resource. Current applicability of a candidate recovery operation can vary by the system environment (e.g., online trade vs. batch execution), by current resource property values or by current resource state. Operation ordering, as described above, further provides directives for appropriate sequences of recovery operations should some recovery operations fail to yield the anticipated result. In this manner, a number of functions can be achieved, such as:

Repeated retries can be limited and scoped based on success or failure of invocation.
Sensitivity to the current operational characteristics of individual resources of the business application represented by the Recovery Segment can be used to programmatically influence choice or preference for recovery operations.
Sensitivity to the Pattern System Environment that describes the current state of the environment can be used to alter preferences of recovery, programmatically and dynamically.
Historical data that is captured and maintained in runtime by business resilience can be used to alter recovery choices dynamically.

Ordering of Operations Dynamically Considered in Creating Recovery Flow

Once recovery operations are selected, the ordering of operations across resources is dynamically assessed and enforced. In one implementation, an ordering technique, described in a co-filed, U.S. Patent Application, entitled "Means for Defining and Validating Achievability of Business Application Availability Goal," Bobak et al., (POU920070111US1), may be utilized. Alternatively, a list of operations and the desired sequencing of those operations may be specified by the customer. For example, in one implementation, the ordering may be provided in a fixed format as a file within the file system, and the BR system is provided the directory and path information to locate the file.

The operations that result from the assessment in the above steps are fed into the operation ordering technique to determine a complete, ordered set of operations that are to execute to recover the failed situation. This is different from recovery plans that are generated with today's products, since today, a fixed set of operations and ordering is used and there is no ability to factor in operation ordering dependencies as part of the recovery plan formulation, and these dependencies may change over time causing inconsistent and incorrect recovery plans. Using the recovery process generation in the business resiliency design, any recovery operations that are selected are evaluated dynamically for dependencies and a consistent set of actions are put into the recovery process.

Parallelization of Operations for Achieving Optimal Recovery Time

In products today, recovery actions may be executed as a set of sequential operations in preconfigured scripts, without the ability to parallelize the operations for optimizing recovery time. As described above, an ordering routine is invoked by the recovery process. In one implementation, the ordering routine may maximize parallel execution of operations as described in the dependency order operations routine of a co-filed, U.S. Patent Application entitled "Means for Defining and Validating Achievability of Business Application Availability Goal," Bobak et al., (POU922007011US1). Other implementations may provide files with ordering directives or may provide algorithms from customers or vendors.

Parallelization may be achieved by taking the set of operations that have no pre-ordering dependencies first, then evaluating the residual set next, and determining which of the residual set needs to be staged further, etc. This technique parallelizes to the maximum extent possible, while preserving the ordering dependencies across resource operations. Recovery processes generated by business resiliency use this process to ensure that operations occur as soon as possible, creating multiple branches for execution of the operations for parallel activities.

Using Assessment, Ordering and Parallelization Techniques to Limit Effect of Recovery to Scope of Outage A function provided by the processing described herein is to 'right size' the recovery impact, so that it is limited to the outage impact, to the degree possible. In many situations with today's products, an application failure causes an entire server to fail over; e.g., a storage volume failure can cause an entire site to be swapped. The recovery process described herein is iterative with each execution addressing the lowest level potential cause of the outage. Assessment of non-responsive resources is performed before recovery operations on failed or degraded resources. Each iteration of the recovery process targets a recovery operation to the failed or degraded resource occurring closest to the root of the one or more DAG(s) representing relationships among resources being evaluated for the outage.

The recovery operations that are formulated into a recovery plan by business resiliency are evaluated based on assessing, for instance, what is actually affected in the environment, which operations can be used, and what dependent operations are to be included. The impact scope of the recovery is targeted to be consistent with the outage scope, and when there are recovery operations that will affect multiple business applications, the information is surfaced and tradeoffs can be automatically handled if the customer has chosen to constrain the recovery impact of one application on another.

Determination of What Impact Recovery Actions Have on Business Applications

The recovery process formulates a set of operations to address each iteration of recovery processing. Those operations may alter the state of resources which are shared across two or more business applications. Invocation of a processing routine to evaluate the potential impact and determine if such impact is acceptable is performed by the recovery process. In one implementation, where shared resources are not supported, approval of each iteration may be returned by the routine. An alternative implementation may have a fixed list of resources on which recovery actions may be performed without damage across business applications. In yet a further implementation, the routine may be as described in a co-filed, U.S. Patent Application, entitled "Method for Constraining Availability Impact between two or more Business Application," Bobak et al., (POU920070115US1).

This is an advantage of the business resiliency design, since in today's products there is no capability and no process to evaluate the formed recovery plan's projected impact, and assess whether that is an allowed impact before executing the plan. In today's products, this is a serious problem because the effect of recovery plans is unpredictable, and may not be desirable, once the impact of the recovery itself is known.

Determination of Targets for Resources Which Need to Be Moved

In addition to determination of recovery actions, each action that requires a resource move to a different hosting location is determined through inspection of the operation table entry. The recovery process determines if there are start operations for an operating system which require a target computer system. It will also determine if there are start operations for a subsystem which require a target operating system. A routine to select the target is invoked by the recovery process for both operating system start and subsystem start operations. In one implementation, a customer may provide a table directing start operations to a desired target. Such a table could change during ongoing processing with changes effected on the next execution of the recovery process. Alternatively, a technique for selection of operation targets may be as described in a co-filed, U.S. Patent Application, entitled "Use of Redundancy Groups in Runtime Management of Business Applications," Bobak et al., (POU920070113US1). This technique utilizes redundancy group pairings and co-locate pairings to determine an optimal target for start operations.

If there is a requirement for attract or repel pairing, then techniques are used to choose a target, optimizing across the entire set of resources needing a target. The resources with the least choices for hosting locations are considered first, sub-setting based on operational/available state of the resource being selected. The resources with requirements attract/repel with other like resources on the same host are also considered.

Submission Of Recovery Process

The recovery operations formulated into a sequence by the recovery process may be submitted for execution in a variety of ways. Recovery processing invokes a routine to submit the recovery process with a structured list of recovery operations. Each entry in the list of recovery operations includes, for instance, the resource acted on, the operation to be performed, and a set of sequencing information. If the dependency order operation routine was utilized, sequencing information may include identification of a relative sequence number for the operation, as an example. Additionally, a list of operations which occur after in the form of an index into the input list may also be provided.

In addition to the recovery operations and the order for execution, the recovery routine provides a routine to be included before and another routine to be included after each recovery operation. The before and after routines enable the recovery process to be notified of completion, successful or failure, of each recovery operation. Timing for execution of each operation is also made available to BR through the before and after routine. An additional routine is provided to be executed at completion of the set of recovery operations. In the logic described below for monitoring of recovery processing, the steps for evaluation of recovery operations and control of subsequent iterations of recovery processing are described.

In one implementation, a routine to build a workflow in industry standard BPEL format may be invoked to submit recovery operations.

Visualization Capability for the Generated Recovery Plan

The recovery process creates a list of recovery operations and required (or suggested) ordering, which is in a published format. If the routine to submit the recovery process as a BPEL workflow is utilized, any standard BPEL based editor may be used for visualization of the created recovery process. Alternatively, plugins to the Eclipse framework may be provided to create a visual rendering of the recovery process for the list of operations. Visualization of a proposed recovery plan with any tooling is not part of today's technology. Further, visualization of a standards based workflow for recovering the environment is also not offered today. Once visualized, the recovery plan is much more easily evaluated for effect, flow, progress, etc. by the administrator.

Ability to Adjust Recovery Flow for New Resources/Relationships

Recovery plans today are generally coded to have specific resource identifiers, followed by specific targets for recovery, and assume a fixed set of information about these resources and relationships between resources. The recovery formulation described herein does not rely on a fixed set of resources or relationships, rather uses information described in the pairings, information from the historic capture of information and update of runtime averages, and the dynamic assessment of state to form the recovery workflow. New resources and relationships, once described through their abstract representations in pairings and once enabled for capture of operation execution times historically, can participate in this configuration without requiring a vendor provided code update (e.g., by IBM®) to alter the resulting recovery processing. Many of today's products require the alteration of either vendor provided code or customer/services written scripts to include additional resources and factor in additional relationships.

Summary for Creating Recovery Process

The process of creating a recovery process is based on a sequential and aggregative series of steps. For example:

1. A Containment Region (CR) may be populated with the failing resource and any impacted resources based on 1st level state aggregation rules, as described in a co-filed, U.S. Patent Application, entitled "Facilitating Identification of Resources Affected by an Event," Bobak et al, (POU920070118US1). Alternatively, a fixed time may be allowed to pass during which reported errors are accumulated into a list used as input to the recovery processing described herein. Recovery processing operates on the basis of the input list of resources for evaluation. If the methods of CR processing are utilized, further advantages are gained in achieving recovery time goals and in correlating related failures.
2. Processing which delays for accumulation of errors may be followed by evaluation of the environment to determine if additional resources should be included in the evaluation of the outage. Such processing may have a list of related resources to query. Alternatively, a database with resource and relationships information, such as a CMDB, may be utilized to determine potential resources to be queried. As another alternative, processing as described in CR construction and evaluation may be employed.
3. Just prior to invoking recovery processing, current resource state may be retrieved. While not necessary for correct execution of the recovery processing described herein, further advantages are gained in the reliability, completeness and correctness of error evaluation, if current resource state is gathered after the last failure event being accrued into the list of resources under evaluation for the current outage. One example of such processing may be found in the description of CR processing cited above.

At this point in time, the BRM has, for example, the following information available to it to generate a recovery process:

1. The list of resources for evaluation and an indication of the reason for being included for evaluation. In one implementation, this may be the contents of a CR.
2. Operation ordering rules.
3. Operation impact pairing rules.
4. Operation table information on escalation ordering for operations.
5. Preferred recovery operations, which in one implementation, may have been generated during policy validation and preparatory processing of the environment.

One example of the steps used to create a recovery process include:

1. For non-responsive resources, determine if there is an operation to be invoked to place the resource in a determinate state. Iteratively process the one or more DAG(s) representing resources under evaluation for recovery processing from the root to the leaf nodes. Perform at most one operation to achieve a determinate state for each distinct branch of the DAG.
2. When all determinate actions on non-responsive resources have been undertaken, evaluate the DAG from root to leaf nodes. For each distinct branch of each DAG, perform one recovery operation for a failed or degraded resource.
3. For each iteration of the recovery process, invoke a routine to determine the set of dependent operations to be included in the set of recovery operations invoked.
4. For each iteration of the recovery process, invoke a routine to assess constraints on operations impacting resources supporting two or more business applications.
5. Invoke a routine to submit the recovery operations for each iteration of the recovery process. Activities to monitor the execution of the recovery operations are provided.
6. Monitoring of activities in the recovery process determine if additional iterations of recovery processing are required or when recovery processing has succeeded in making the IT environment available.

Persistence of Recovery Process

The recovery process may be persisted in, for instance, a set of DB2® tables associated with the Recovery Segment. In particular, in one implementation, a workflow table is utilized. One embodiment of a workflow table and related tables is described with reference to FIGS. 9A-9B.

A Workflow table 902 (FIG. 9A) is used to persist the various workflows (e.g., preparatory, recovery, delta, undo, etc.) associated with a goal policy. In one example, the fields of workflow table 902, include, for instance:

| Data Field | Data Type | Description | Keys | Index |
|---|---|---|---|---|
| WORKFLOW_ID | Integer | Generated integer key for uniqueness via a DB2 sequence. Note all primary keys in the BR database will be a generated integer for compatibility with other non-DB2 databases. | Primary | |
| POLICY_ID | Integer | Foreign key from the policy table that can be used to retrieve the workflows for a particular policy. | Foreign | |
| CR_ID | Integer | Foreign key from the containment region table that can be used to retrieve the workflows for a particular Containment Region. | Foreign | |

-continued

| Data Field | Data Type | Description | Keys | Index |
|---|---|---|---|---|
| WORKFLOW_BPEL | Clob(1M) | BPEL workflow proper | | |
| WORKFLOW_TYPE | Integer | The index into the array of workflow types supported by the BR. For example:<br>1. Preparatory<br>2. Recovery<br>3. Undo<br>4. Delta<br>5. Preventive<br>6. Phase 2<br>7. Etc. | | |
| WORKFLOW_MODIFIED | Char(1) | Flag to indicate whether administrator modified the workflow (WF). | | |
| MODIFIED_WORKFLOW_BPEL | Clob(1M) | Modified workflow (if WF_Modified = 'Y'). | | |
| WORKFLOW_EXECUTED | Char(1) | Flag to indicate whether administrator chose to execute the generated or the modified WF. | | |
| BPEL_NAME | Varchar(64) | BPEL workflow name. | | |
| BPEL_ID | Varchar(128) | BPEL workflow UUID. | | |
| OPORDER_ID | Integer | Key into the workflow resource table to the list of resources and operations for workflow ordering. | | |
| SUMMARY_STATE | Integer | Recovery Segment summary state at the time of the execution of this workflow. | | |
| RESOURCE_ID | Integer | Key into the workflow resource table to the list of resources. | | |
| UNDO_WORKFLOW_BPEL | Clob(1M) | Undo workflow for the Workflow_Type. Undo workflows are read-only from the BR UI. | | |
| UNDO_WORKFLOW_EXECUTED | Char | Flag to indicate whether the undo workflow was executed. | | |
| UNDO_OPORDER_ID | Integer | Key into the workflow resource table to the list of resources and operations for workflow ordering. | | |
| UNDO_SUMMARY_STATE | Integer | Recovery segment summary state at the time of the execution of this workflow. | | |
| UNDO_RESOURCE_ID | Integer | Key into the workflow resource table to the list of resources. | | |
| TS_UPDATE | Timestamp | Timestamp of initial create or last update and defaults to current timestamp. | | |

In one implementation, an undo workflow is created using similar logic used to create an undo preparatory workflow, as described in a U.S. Patent Application "Dynamic Selection of Actions in an Information Technology Environment," (POU920070117US1), Bobak et al., co-filed herewith, which is hereby incorporated herein by reference in its entirety.

Workflow_Resource Table

Workflow_Resources table 904 (FIG. 9A) is used maintain the list of resources and operations that are created as the workflow is generated. In one example, this table includes:

| Data Field | Data Type | Description | Keys | Index |
| --- | --- | --- | --- | --- |
| WF_RESOURCE_ID | Integer | Generated integer key for uniqueness via a DB2 sequence. Note all primary keys in the BR database will be a generated integer for compatibility with other non-DB2 databases. | Primary | |
| WORKFLOW_ID | Integer | Foreign key from the workflow table that can be used to retrieve all the resources and operations for a particular workflow. | Foreign | |
| LIST_TYPE | Integer | Index into the array of possible BR topologies:<br>1. Ordering list<br>2. Root operation list (created at policy validation)<br>3. Etc. | | |
| SEQUENCE | Integer | Sequence of the resource/operation in the WF if the list type is for ordering (#1 above). | | |
| BRMD_ID | Integer | Key into the BRMD table to identify the resource. | | |
| OPERATION_ID | Integer | Key into the operation list for the resource pointed to by the BRMD_ID field. | | |
| TS_UPDATE | Timestamp | Timestamp of initial create or last update and defaults to current timestamp. | | |

Figure 9A:
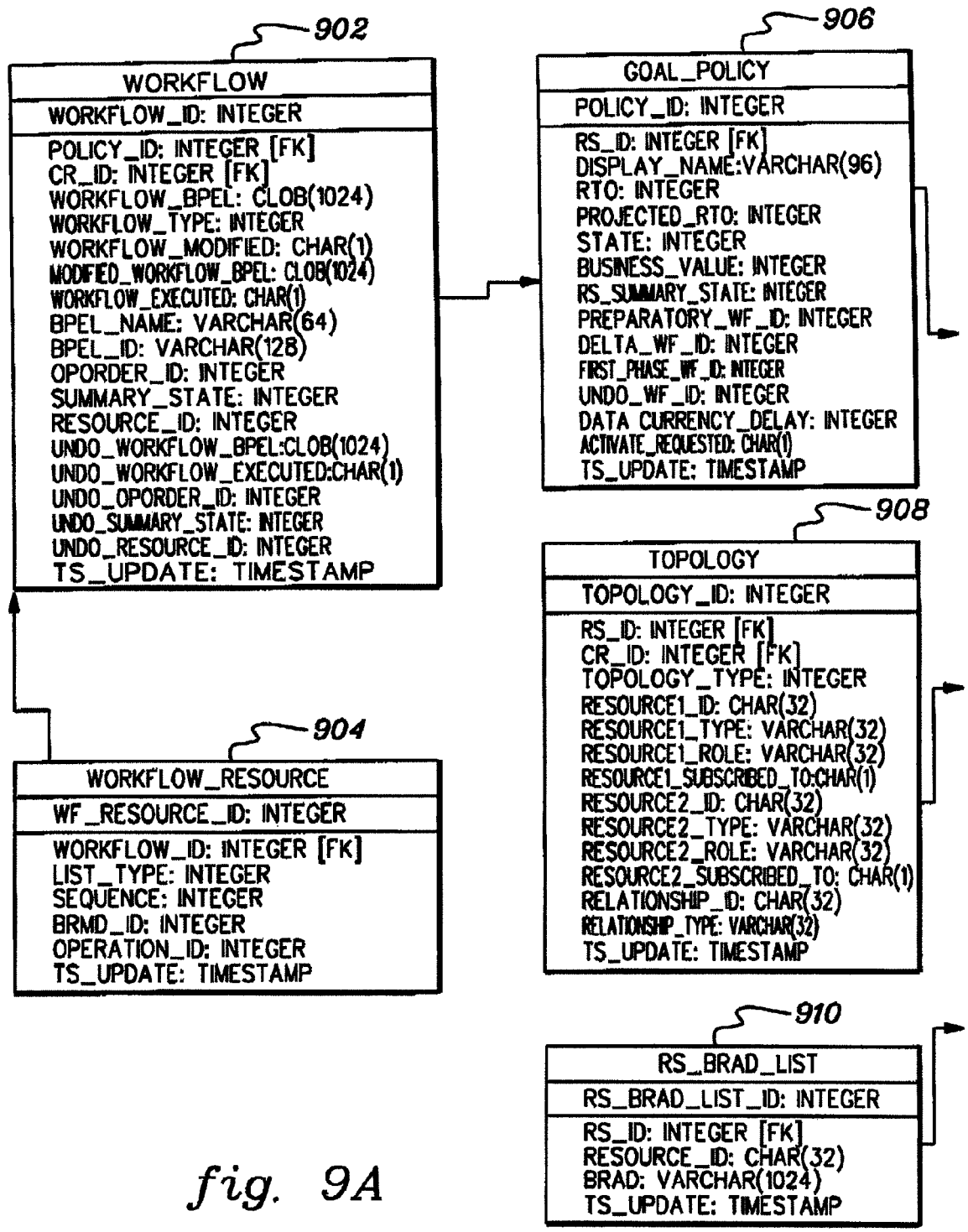

Other tables associated with the workflow table include, for instance, a Goal Policy table 906, a Topology table 908, a Brad List table 910 and a Recovery Segment 912, each of which is depicted in FIGS. 9A-9B.

Creating Recovery Process

A recovery process, which is tailored to the specific environment and outage conditions, is created. Information used to create the recovery process includes, for instance:

1. A list of resources which may be failed or degraded. In one implementation this list may be contained in a Containment Region, and in particular, be represented by a CR.States array.
2. Resource relationships reflecting the impact a failure or degradation of one resource can have on other resource (s). In one implementation, this may be provided by impact pairings in the BRRD.
3. Operation ordering information indicating between two operations on the same or different resources if one operation is required to come before or after the other. In one implementation, this may be provided by operation ordering pairings in the BRRD.
4. Operation effect information indicating what execution of an operation on a resource may be to the state of the same or another resource. In one implementation, the information may be provided by operation effect pairings in the BRRD.
5. Order for operation escalation when a recovery operation fails. In one implementation, the information may be provided by Order and Vorder fields within the operation table.

Outages which are reported by resources or detected during requesting resource data are accumulated in a process which precedes creation of a recovery process. In one implementation, this may be performed by an Asynchronous Query Build Process. In a further implementation, data can be collected for a fixed time interval. The process for gathering resource state data may attempt to relate multiple outages and accumulate data for multiple resources before invoking the following logic to form a recovery process. In one implementation, multiple outages are related through pairing information in the BRRD and accumulated into a CR.

The formulated recovery process may be executed to restore the environment to an available state. In one implementation, the environment may be a Recovery Segment representation of a business application. Execution of the recovery process is monitored as described below. As operations in the recovery process complete, a determination is made regarding the successful execution and available state of the resource the operation was intended to affect. It may be true that a recovery operation does not complete normally or if completing normally, the operation failed to transition the resource to an available state. If such a condition exists, the monitoring of the recovery process causes subsequent operations to be bypassed resulting in termination of the recovery process. In another implementation, some or all of the remaining operations in the recovery process may be enabled to execute.

When the recovery process ends, either with all operations executing normally or with operations failing to result in the environment transitioning to an available state, an assessment of the recovery process is undertaken. If the environment has not transitioned to an available state, an iteration of resource data gathering is initiated. In one implementation this may be achieved by invocation of an Asynchronous Query Build Routine. Data on resource state is collected subsequent to execution of a portion of the recovery process before the next iteration of forming the recovery process is invoked.

The iterative nature of recovery process execution on failure to transition the environment to an available state may also be used to divide the recovery process into multiple phases. In one implementation, as described below, multiple iterations of recovery process execution may be used to incrementally progress the environment to an available state. Incremental execution of the recovery process is undertaken for multiple reasons including, for instance:

At the end of the resource data gathering phase, there may exist resources for which resource state subsequent to the latest failure has not been acquired.

Operations required to transition the environment to an available state may require further resource outage. For example, if a resource is not responding, it may be necessary to terminate the application, application container, operating system or reset the computer system. In another example, if a subsystem has failed, it may be desirable to fail a dependent subsystem in order to insure the restart of both subsystems occurs on the same operating system image.

Execution of operations in a recovery process may or may not complete without error and may or may not result in transitioning the effected resource to an available state. Therefore, there are a large number of permutations on potential outcomes of recovery process execution. Providing conditional execution of operations in a recovery process based on the successful or unsuccessful execution of each operation would be computationally complex. A preferred approach, in the implementation below, may be to incrementally execute phases of the recovery process.

Expression of dependencies among multiple resources state in a complex environment may be incomplete. If there are missing expressions or an incomplete understanding of the impact one resource may have on another resource, undertaking a recovery operation to restore one resource may not be evaluated as affecting other resources. As an example, recovery of CICS® may cause the DB2® subsystem used by CICS® to become available from a degraded state. Alternatively, DB2® may be in a degraded state independent of the state of CICS®.

Resource providers define the operations and states supported. Either through programmatic expression or written documentation, the lifecycle for a resource, the state at each phase of the lifecycle and the one or more operations which transition the resource between states are defined. The vendor providing the resource, the customer utilizing the resource or, for some IBM® resources, the BR system provides for formalizing the resource state and operation data.

The BR system provides, through the UI interactions, means for defining resource state and the effect of operations on resource state. In one implementation, vendors or customers may provide templates representing best practices which express recovery operations impact on resources and operation ordering. For some resources, combinations of basic operations may be grouped into more complex operations. The more complex, aggregated operations may then also be represented as recovery operations.

Within BR, in one implementation, the list of operations supported by a resource are expressed in operation table entries associated with the BRMD entry for the resource. In one implementation, the recovery process may operate utilizing operation data from the operation table entries. Such an implementation would provide no distinction among different periods of time relative to execution of the IT environment. In another implementation, as described below, variations in the IT environment are represented in Pattern System Environment(s) (PSE(s)). Operation execution timings are associated with each PSE and utilized by the recovery process in determining what operation is preferred to achieve the availability goal of the IT environment.

In one implementation, the BR system may be further informed of resource operation effects through pairing data stored in the BRRD. Pairing information may include information on the effect an operation may have on a resource or ordering requirements among two operations. An implementation which utilizes operation information from the BRMD and operation information from pairings is described below. Two sources of information on candidate recovery operations exist in such an implementation:

Operation effect pairing in which the failed/degraded resource is resource2 with an available state.

BRMD referenced operation table entries of Category recovery.

If an operation on a resource appears in both sources, the operation effect pairing takes precedence. This enables evaluation of conditional applicability of the operation based on the pairing trigger. The pairing trigger can filter applicability of operations based on current resource state, resource property values, current Recovery Segment state and IT environment, as reflected in the current PSE.

The following are basic examples which may provide rationale for one implementation of forming a recovery process.

Example 1

Assume there exists a resource, Res1, which has two states, unavailable and available, and an Operation A which transitions Res1 from unavailable to available. The BRMD for resource Res1 has an associated operation table entry for Operation A indicating it is a recovery operation. In one implementation, if Res1 is reported or detected to be failed, the recovery process locates Operation A as a potential recovery operation from the operation table associated with the BRMD and includes Operation A in the recovery process.

Extending this example, it may be that Operation A accepts one or more parameters which alter the execution of Operation A. Assume Operation A has one option for a cold start and one option for a warm start. Further, assume a cold start is desirable because it removes residual temporary data, while a warm start is desirable because it completes more quickly. A customer may choose the warm option during production times and cold off shift. Two operation table entries may be associated with Res1, Aw and Ac, for warm and cold start. Control over which operation is to be used may be achieved by specification of an operation effect pairing with trigger conditions:

Opeffect (Res1, Ac) sets (Res1, state=available) when PSE=Production

Opeffect (Re1, Aw) sets (Res1, state=available) when PSE=Offshift, where a PSE has been defined for Production and OffShift.

In a further example, similar logic can be used when there are more than two recovery operations associated with a resource.

Example 2

Assume there exists a resource, Res1, which has three states, unavailable, available and failed. Further assume to transition from failed to available, Operation C, requires different processing than a transition from unavailable to available, Operation A. Also assume there exists an operation, Operation B, which transitions Res1 from failed to unavailable.

There exists two means to transition Res1 from a failed state to an available state. Either Operation C may be selected or Operation B followed by Operation A may be selected. For example, it may be that a database system has a Recover operation to transition from failed to available, a Shutdown operation to transition from failed to unavailable, and a Start-Cold to transition from unavailable to available. The operation sequence Shutdown, Operation B, followed by Start-Cold, Operation A executes longer than Recover, Operation C.

One approach may be to define two pairings where each pairing applies two of the failed or unavailable states transitioning to available:

Opeffect (Res1, Recover) sets (Res1, state=available) when Res1.state=failed

Opeffect (Res1, StartCold) sets (Res1, state=available) when Res1.state=unavailable.

Another approach may be to define two means for transitioning Res1 to an available state from a failed state. It may also be a recommended best practice by the vendor of Res1 or by the customer to attempt the Recover operation before the Shutdown and StartCold sequence. Two changes enable the second sequence. The operation effect for StartCold is modified and an operation ordering pairing is indicated.

Opeffect (Res1, StartCold) sets (Res1, state=available)

Oporder Res1.Shutdown before Res1.StartCold when Res1.state=failed.

There may exist a customer preference or resource provider best practice directing the preference for which of the two sequences is performed and directing a preference for escalation from a first attempt at recovery to a second attempt at recovery. Within the operation table entry associated with the BRMD of the resource two fields direct escalation processing. A first field, Category, indicates what a given operation may produce in transitioning the state of the resource. For recovery processing, a Category of recovery is utilized. A second field, Order, is a numeric value from 1 to n establishing the ordering for operations within the same Category. Operations of order m are performed before all operations of order<m. All operations of the same order are equally eligible to be performed. A third field, Vorder, includes the vendor or best practices recommended value for Order. The Order field is initialized from Vorder prior to any customer modification of preferred escalation ordering.

In a further implementation, ordering may be dependent on the IT environment. In such an implementation the Order, Vorder fields of an operation may be associated with a PSE_ Operation table. Such an implementation may allow for different escalation ordering of operations dependent on the IT environment current at the time a recovery operation is to be selected.

One way in which operation effect and operation ordering may be utilized is demonstrated by this example. Operation effect may cause recovery operations to be selected and may be further tailored to have recovery operations selected conditionally based on the state of the environment. Operation ordering may be used in conjunction with operation effect to alter the current environment to a condition suitable for execution of a recovery operation.

Example 3

Assume the existence of a subsystem, SubsysA, for which there exists a dependent subsystem, Depssa. Normal processing causes the dependent subsystem to terminate on failure of SubsysA. However, there are unpredictable conditions which may preclude termination of the dependent subsystem. For example, the dependent subsystem may fail to complete termination due to, for example, logic errors, serialization on resources held by other processes, failure of storage systems or network systems to respond. The following impact pairing and operation effect pairing would handle normal processing of the relationship between SubsysA and Depssa.

Impact subsysA (state, failed) makes_unavailable depssa

Opeffect (depssa, Start) sets (depssa, available) when depssa.state=unavailable.

Extending the example to address the failure of Depssa to terminate would add the following oporder pairing:

Oporder OSx, Cancel depssa before depssa, Start when depssa.state!=unavailable,

Where recovery processing substitutes the current OS hosting Depssa for OSx.

The recovery processing logic described below causes the Cancel of a Depssa operation to be invoked due to the non-responsive state of Depssa before proceeding with recovery operations for SubsysA and Depssa.

This example and the second sequence of Example 2 demonstrate a feature of recovery processing. Where there exists non-responsive resources in the set of resources for which recovery may be required, a first phase of processing addresses the non-responsive resources. A preliminary assumption is made that the non-responsive resource may be failed or degraded and a recovery operation to make the resource available is selected. If such an operation exists, a determination is made regarding any operations which are to occur before the recovery operation is performed. Typically, as in these two examples, the operation ordering for the precursor operation has trigger conditions which tailor selection to the environment. If precursor operations exist as in Example 2 above with Res1.Shutdown or Example 3 with OSx, Cancel Depssa, recovery processing causes those operations to be invoked before forming subsequent phases of recovery processing.

Evaluation of non-responsive resource(s) is performed by traversing the one or more DAG(s) of resources comprising the collection under recovery evaluation. At each successive iteration, the DAG(s) are processed from the root to the leaf nodes. Along each branch where a non-responsive resource is found having a precursor operation, the precursor operation is selected and the remainder of the branch of the DAG is not processed during that iteration.

When recovery processing has no non-responsive resources in the collection of resources under recovery evaluation, processing to perform recovery operations for failed and degraded resources begins.

Example 4

This is one example of a sequence of recovery operations based on "System Z Parallel Sysplex Recovery" GA22-7286-01, December 2006, which is hereby incorporated herein by reference in its entirety. Multiple variations of this example are possible based on what computer system and what operating system host the subsystems. As one variation, assume a computer system, CS1, hosts an operating system, OS1, which hosts a CICS® subsystem. Assume a second computer system, CS2, hosts an operating system, OS/2®, which hosts a DB2® subsystem. CICS® utilizes DB2® for transaction processing. If CICS® fails, transactions being serviced by DB2® also fail resulting in DB2® being in a degraded state. The impact relationship between CICS® and DB2® is expressed as:

Impact CICS (state, failed) degrades DB2.

An operation effect pairing provides the desired recovery operation to be performed on a CICS® failure:

Opeffect (CICS, Start) sets (CICS, available) when CICS.state=failed.

In this example, there is a one level cascading effect. A failure of CICS® causes DB2® to be degraded. Multiple levels of cascading effect may be represented in impact pairings as may be seen if degradation of DB2® resulted in degradation of another subsystem utilizing DB2®. Recovery processing evaluates series of cascading effects and iteratively invokes recovery operations from the root of the DAG relating resources to leaf nodes. Since recovery operations may function correctly, may not function correctly and if functioning correctly may or may not alter the state of a resource further from the DAG root, recovery processing invokes one level of recovery operation at each iteration. When evaluating the one or more DAG(s) representing the relationships among the collection of resources under recovery evaluation, the first occurrence of a failed or degraded resource in a branch of the DAG causes the desired recovery operation to be invoked in that iteration of recovery processing. The remainder of the resources along that branch of the DAG are not processed in that iteration.

Note, there is no requirement for an operation effect pairing indicating that a Start operation on CICS®, causing CICS® to become available, results in DB2® becoming available as recovery processing can evaluate that effect from the impact pairing.

With the above, a failure of CICS® would result in DB2® becoming degraded. Recovery processing would evaluate the DAG and invoke a Start operation on CICS® and no operation on DB2® for the first iteration. If the Start operation on CICS® resulted in CICS® and DB2® transitioning to an available state, no further recovery operations would be invoked. If DB2® failed to become available after the successful execution of a Start on CICS®, DB2® state would be evaluated and a recovery operation for DB2® may subsequently be invoked.

Continuing with the example, assume OS1 is nonresponsive and further assume the effect extends to CICS® being nonresponsive. On entry to recovery processing, DB2® is degraded, CICS® is nonresponsive, OS1 is nonresponsive, CS1 is available, CS2 is available and OS2 is available. Assume through best practices the following pairings have been adopted:

Impact OSx (state, failed) makes_unavailable CICS,

Where OSx is evaluated to be the hosting operating system at any point in time for CICS®.

Impact CSx (state, failed) makes_unavailable OS1,

Where CSx is evaluated to be the hosting computer system at any point in time for OS1.

Opeffect (OS1, Start) sets (OS1, available) when OS1.state=NotResponsive.

Oporder CSx, Reset before OS1, Start when OS1.state=NotResponsive.

With the above on initial entry to recovery processing a first iteration causes the CS1, Reset operation to be performed. Under normal conditions this will cause OS1 to become unavailable. As a result, the following pairing is needed to address the unavailable state for OS1:

Opeffect (OS1, Start) sets (OS1, available) when OS1.state=unavailable.

For recovery processing, the desired state of OS1 is available. In other management processes, the desired state of OS1 may be unavailable. The following pairing would provide the needed information:

Opeffect (CSx, Reset) sets (OS1, unavailable),

Where CSx is evaluated to be the current hosting computer system for OS1.

Recovery processing may work in conjunction with scheduling of components. A cooperative management framework may have a scheduling component perform the start of a component when it is needed in support of the business application. Alternatively, BR may find components not started when needed. As an example, if CICS® is not available at the time BR begins active management of a RS, the state of the CICS® resource would be not available with a desired state of available. The following pairing provides BR the needed information:

Opeffect (CICS, Start) sets (CICS, available) when CICS.state=unavailable.

In the above example, best practices at Recovery Segment deployment may recommend the following pairings:

Opeffect (CICS, Start) sets (CICS, available) when CICS.state=NotResponsive

Oporder OSx.Cancel CICS before CICS.Start when CICS.state=NotResponsive

With the above, if the OS hosting CICS® is available, but CICS® is non-responsive, the first iteration through recovery processing causes the evaluation of the current hosting environment for CICS®, in this case yielding OS1, and a Cancel operation for CICS® to be invoked.

In the above example, with a nonresponsive OS1, there are three passes through the recovery process. A first iteration results in the reset of CS1. A second iteration finds OS1 unavailable and results in a Start of OS1. A third iteration finds CICS1 unavailable and invokes a Start of CICS.

One embodiment of the logic to formulate a recovery process is described with reference to FIGS. 10A-10F. As one example, this logic is performed by the BRM component of the BR system.

Formulation of a recovery process begins by setting CR.RecovAQBTOD=Current TOD-CRQBTOD, STEP 1000, and clearing the table of recovery operations to be invoked, STEP 1001. A list of resources under evaluation for recovery operations is created (Res_List) from the input list of resources (e.g., CR.States) and relationships (e.g., CR.PairingsUsed), STEP 1002. From the Res_List, one or more DAG(s) representing the resources under evaluation is created, STEP 1004. The DAG includes vertices that are representations of resources and edges that are representations of relationships.

For each DAG, the root node is accessed, STEP 1006. From the resource state in the Res_List (built from the input list of resources and associated states), it is determined if the resource responded to a request for current state data, INQUIRY 1008. If the resource did respond to a request for state data, the next DAG root is accessed, STEP 1006. Otherwise, no response to a request for current resource state was received and an attempt is made to establish a definitive state for the resource.

Processing to establish a definitive state for a non-responsive resource utilizes operation effect and operation ordering pairings, in one example. Operation effect pairings with Resource2 from the pairing matching the non-responsive resource are retrieved, STEP 1010. Each returned BRRD entry is evaluated, STEP 1012 (FIG. 10B), by first determining if the pairing is currently applicable, STEP 1014. Current applicability is determined by evaluation of the trigger conditions associated with the pairing. In one implementation, all pairings may be viewed as being always applicable. In another implementation, a file listing pairings and date/time ranges in which the pairing is applicable may be implemented. In another implementation, the trigger conditions may be based on runtime environment conditions, as described in a co-filed, U.S. Patent Application, entitled "Conditionally Controlling Management of an Information Technology Environment Based on Runtime Analysis of Pairing Constructs" Bobak et al, (POU920070110US1).

If a pairing is currently applicable, INQUIRY 1016, the pairing is evaluated to determine if it transitions the non-responsive resource to an available condition, INQUIRY 1018. If the operation would transition the non-responsive resource to an available state, any preceding operations are located, STEP 1020. Preceding operations may be recommended by the resource vendor or determined appropriate by customer personnel. As an example, a preceding operation for starting an operating system may be to reset the computer system. In a further implementation, such operations may be classified as preventative operations and formed into an ordered set of commands to precede recovery.

Pairings of operation order type with resource and operation 2 matching the opeffect resource and operation 1 fields are selected from the BRRD. This returns the operations which are to occur before the operation which would place the non-responsive root resource in an available state. In a further implementation, the logic could search for pairings which indicate further operations which are to occur, thereby forming an ordered sequence of operations which are to occur prior to the desired recovery operation. Successive queries to the BRRD for operation ordering pairings where the second resource and operation match the immediately prior retrieved resource and operation 1 would follow the sequence to a point where no BRRD entries were returned.

Figure 10A:
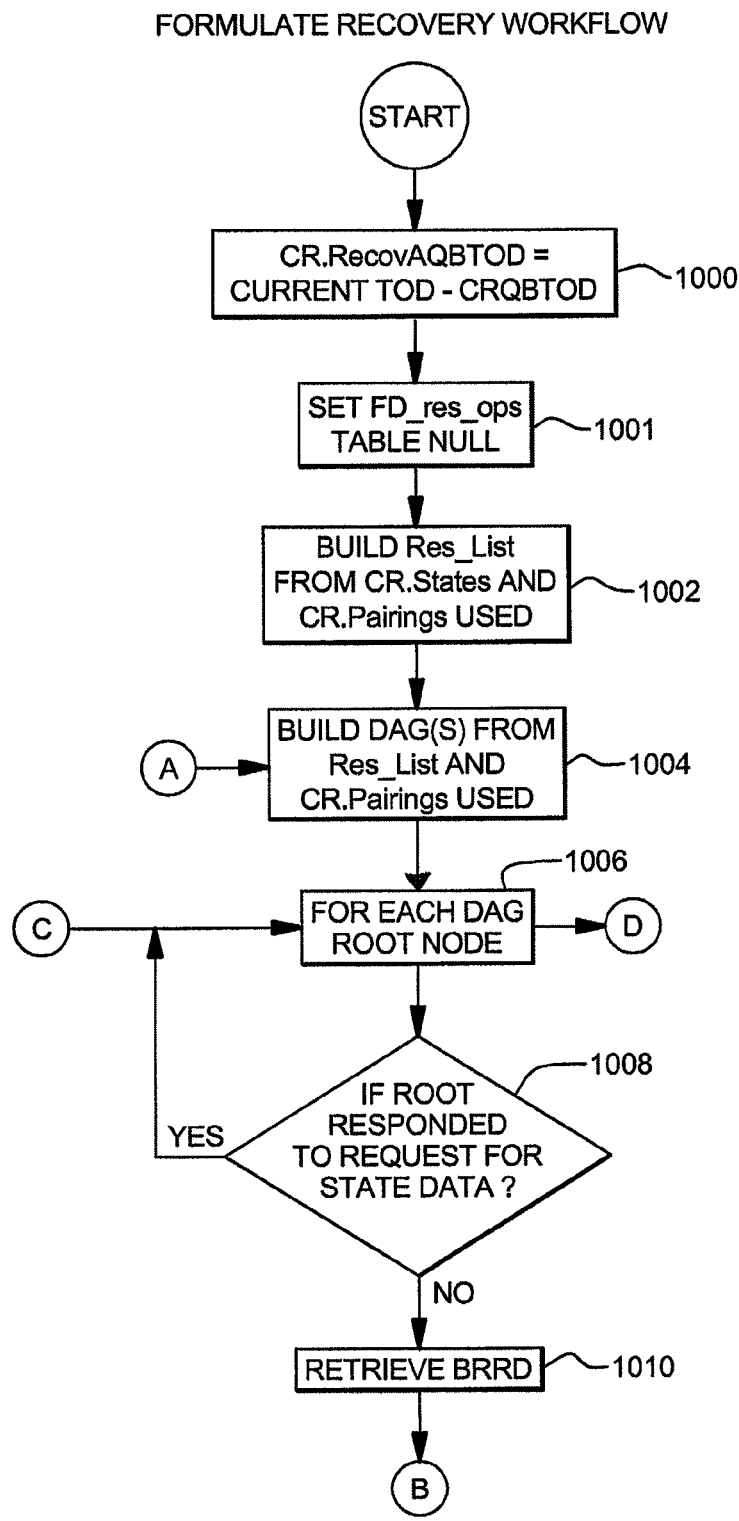
FIGS. 10A-10F depict one embodiment of the logic to formulate recovery workflow, in accordance with an aspect of the present invention.
Figure 10B:
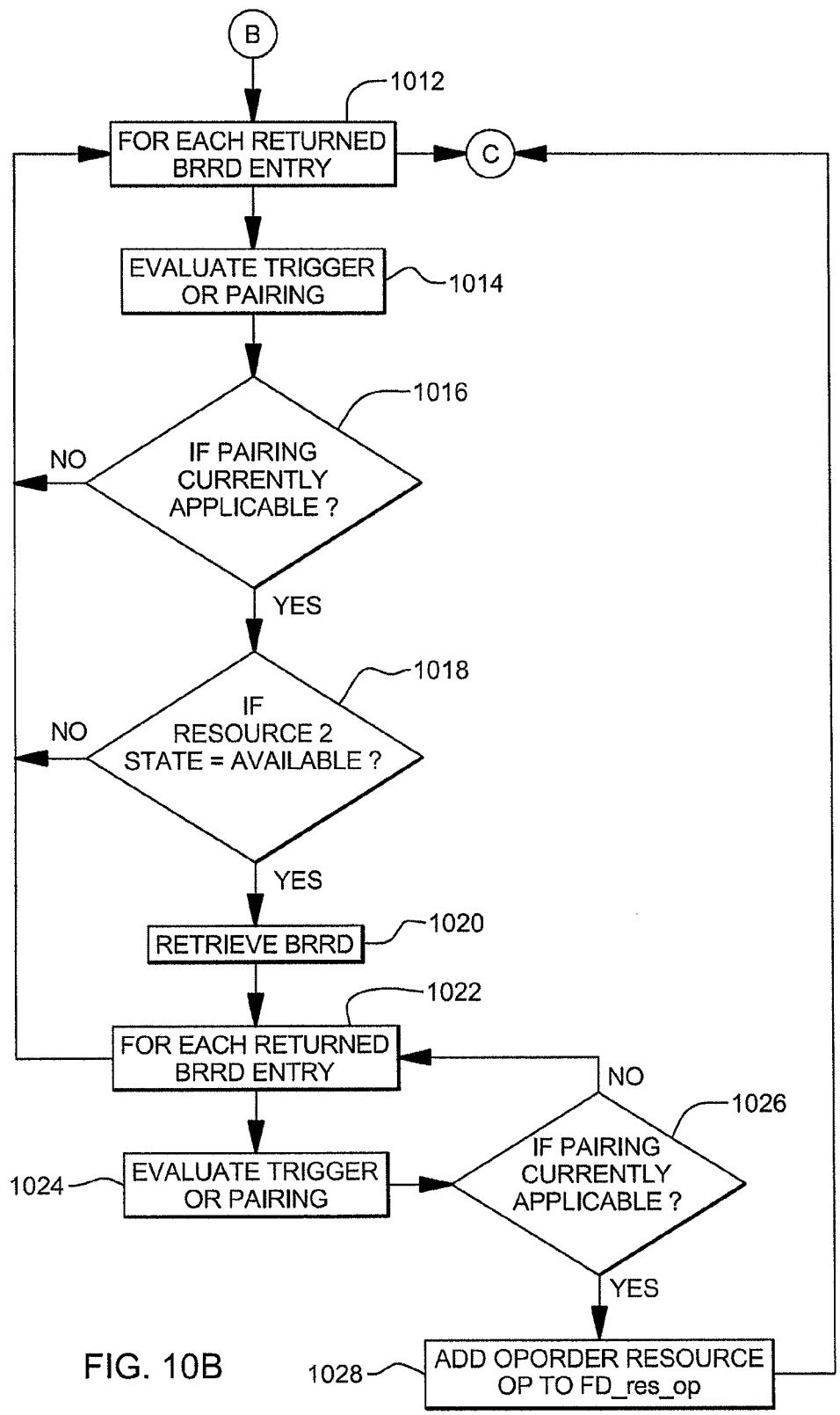

For each returned preceding operation BRRD entry, STEP 1022, the current applicability of the pairing is evaluated, STEP 1024. If the pairing is currently applicable, INQUIRY 1026, the associated resource and operation is added to the table of operations to be performed in this iteration of the recovery process (FD_res_op table), STEP 1028, and processing continues at STEP 1006 (FIG. 10A).

Returning to INQUIRY 1026 (FIG. 10B), if the pairing is not currently applicable, processing continues with STEP 1022.

When all operation ordering pairings have been processed, STEP 1022, the next resource operation which may transition a non-responsive resource to a determinate state is evaluated, STEP 1012. Similarly, if the pairing is not currently applicable, INQUIRY 1016, or if the Resource2 state is not available, INQUIRY 1018, processing continues at STEP 1012. When all operations which may transition the non-responsive root resource to a determinate state have been processed, STEP 1012, the root of the next DAG is processed, STEP 1006 (FIG. 10A).

When all DAG roots have been processed, the list of operations to be performed is evaluated. If any operations have been selected for non-responsive resources, INQUIRY 1030 (FIG. 10C), processing proceeds to prepare for execution of the selected operations, as described below. Otherwise, an evaluation of the next level of the DAG representing resources under evaluation is initiated.

Evaluation of the next level of the DAG(s) is enabled by removing the current root(s) from the list of resources (Res_List) under evaluation for the current outage, STEP 1032. If the resulting resource list is not null, INQUIRY 1034, processing continues by reforming the DAG(s) which will now have new root node(s) to analyze, STEP 1004 (FIG. 10A).

Returning to INQUIRY 1034 (FIG. 10C), when all resources in the current set for evaluation have been examined for non-responsive conditions, the resource list (Res_List) will be null on removal of the last set of root nodes.

Processing of failed and degraded resource states begins when there are no non-responsive resources for which there is some operation which may transition those resources to a determinate state. Processing begins by forming one or more DAG(s) of resources under evaluation for the current outage from the CR.States list of resources and using the CR.ParingsUsed, which is a list of impact pairings used in determining what resources may be associated with the current failure, STEP 1035.

Figure 10C:
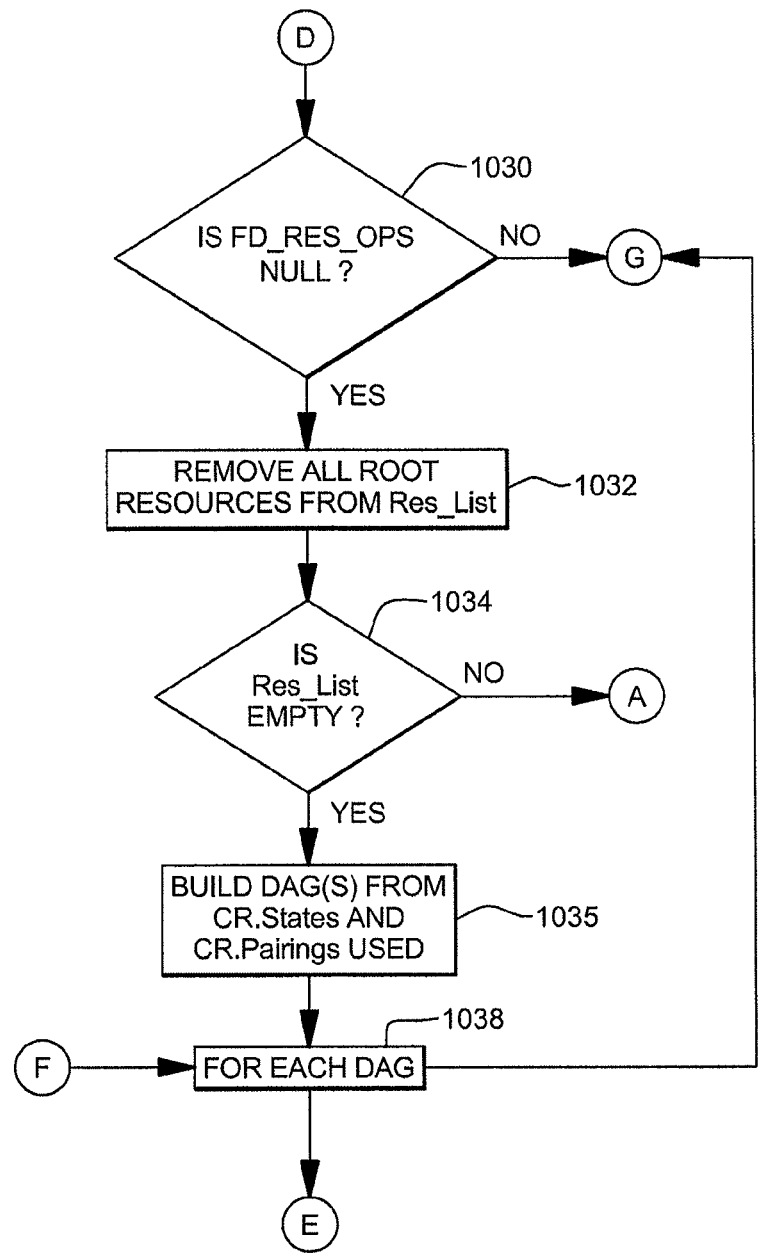
Figure 10D:
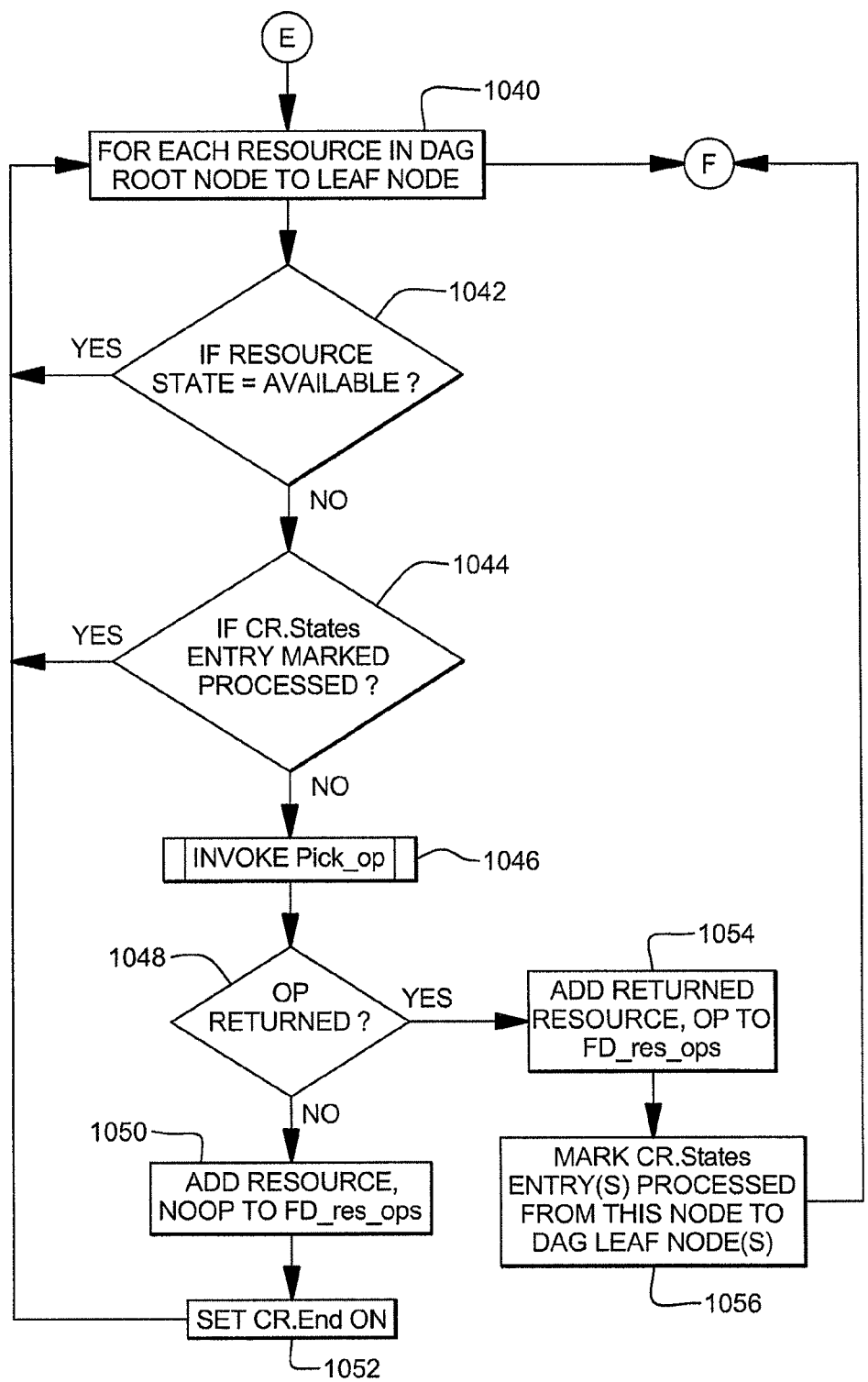
Figure 10E:
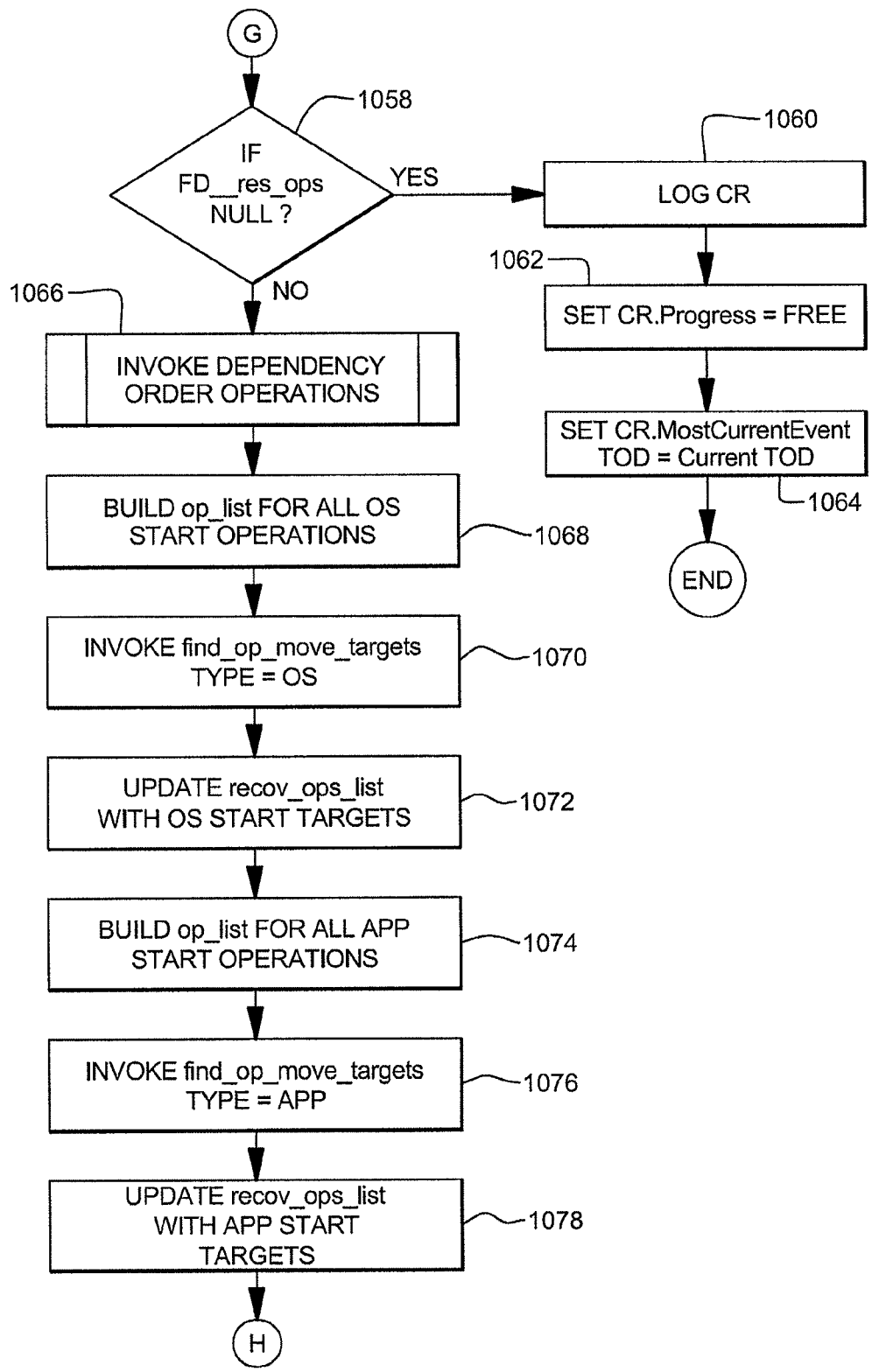
Figure 10F:
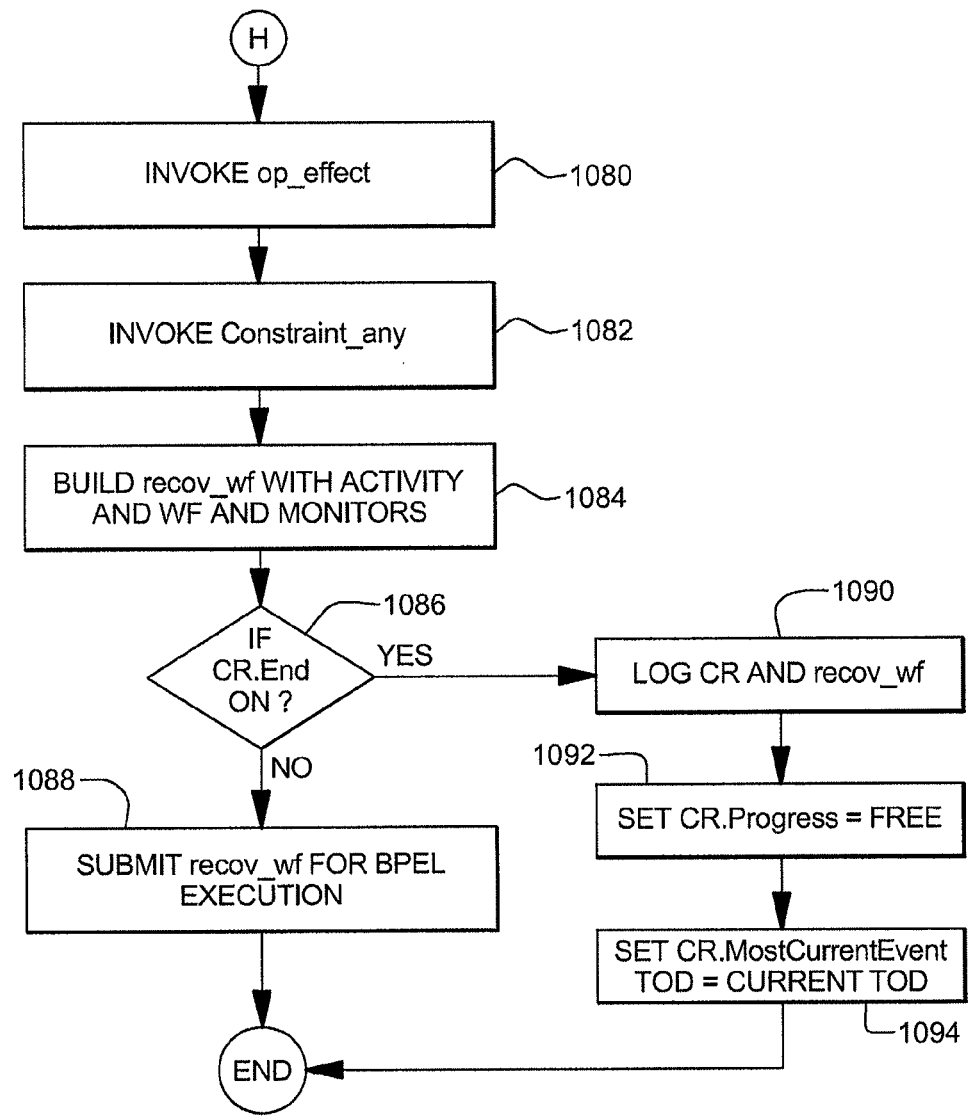

For each DAG formed, STEP 1038, processing proceeds from the root of the DAG to the leaf nodes, STEP 1040 (FIG. 10D). For each resource along a branch of the DAG, the CR.States resource state is examined, STEP 1040. If the resource is available, INQUIRY 1042, the next resource down the branch of the DAG is evaluated, STEP 1040. Otherwise, the current resource in the DAG is not available. It may be true that in evaluation of the DAG the current resource has been traversed and either been evaluated for an operation to be included in the recovery iteration or be down the DAG from a resource for which an operation has been included in the recovery iteration. If the resource has already been processed, INQUIRY 1044, the next resource in the DAG is selected for processing, STEP 1040. Otherwise, the Pick_op routine described below is invoked to locate a recovery operation, STEP 1046.

The Pick_op routine may fail to find an operation to transition the failed or degraded resource to an available state, INQUIRY 1048. In one implementation, processing of the recovery process may be terminated. However, in the implementation, described herein, processing continues. An indication of having found no operation for recovery of the failed or degraded resource is inserted into the list of operations for this iteration of the recovery process, STEP 1050, and a flag is set to indicate the recovery process is not to be executed, STEP 1052. This flag will be interrogated prior to submitting the set of recovery operations for execution. Processing then continues at STEP 1040.

Otherwise, INQUIRY 1048, the Pick_op routine selected a recovery operation and the returned operation is inserted into the table of recovery operations (FD_res_ops), STEP 1054. Any remaining resources in the current branch of the DAG are marked as having been processed, STEP 1056, insuring only the first occurrence of a failed or degraded resource in any branch of the DAG has a recovery operation executed during a given iteration of the recovery process. The next DAG is then selected for processing, STEP 1038 (FIG. 10C).

Returning to STEP 1040, when all resources in this DAG have been processed, processing continues to the next DAG, STEP 1038 (FIG. 10C). When all resources in all DAG(s) have been processed, a determination is made regarding operations to be performed. If no recovery operations for this iteration of the recovery process have been found, INQUIRY 1058 (FIG. 10E), the CR is logged for subsequent analysis as an unexpected condition has been encountered, STEP 1060. The CR is prepared to be freed for reuse by setting the CR.Progress indicator equal to free, STEP 1062, and by setting the most current event TOD (CR.MostCurrentEventTOD) equal to the current TOD, STEP 1064. Alteration of the CR most current event TOD insures any response messages to earlier requests for resource data for the CR and the current outage are discarded.

Otherwise, INQUIRY 1058, there exists some recovery operation(s) to be executed. A routine to establish the order of the selected operations and to add any required or desired precursor operations is invoked, STEP 1066. Such a routine, as described above, may be a file containing a list of ordered operations and required or desired precursor operations. Alternatively, a Dependency Order Operations routine may be invoked in another implementation. Input to the routine to set operation order includes the list of resource/operation pairs. Output includes a list (recov_ops_list) of operation entries, where each operation entry includes the resource/operation pair and sequence number information, as described earlier.

From the recov_ops_list, the set of operations which act on a resource type of operating system and have an operation table indication (Operation_Target) requiring a target for the operation are formed into a list (op_list) for input to the routine that determines a target, STEP 1068. A routine to select a target for start operations of an operating system is invoked, STEP 1070. In one implementation, this may be a fixed list of target computer systems for a list of operating system start operations. In another implementation, a find_op_move_targets routine may be invoked that dynamically selects targets based on current system conditions. On return, the selected target computer system for each operating system start command is inserted into the ordered recovery operations list (recov_ops_list), STEP 1072.

From the recov_ops_list, the set of operations which act on a resource type of subsystem (either CICS® or DB2®, in one implementation) and have an operation table indicator (Operation_Target) requiring a target for the operation are formed into a list (op_list), STEP 1074, for input to the routine that determines a target, STEP 1076. Additional resource types requiring a target for a start command may be included in another implementation, where, for example, a target for starting a web services container, message and queuing, file serving, print serving . . . service would be required and supported by the routine to select a target for a start command. On return, the selected target operating system for each subsystem start command is inserted into the ordered recovery operations list (recov_ops_list), STEP 1078.

In one implementation, a routine to determine the effect of the recovery operations is invoked, STEP 1080 (FIG. 10F), and a routine to determine the impact of the proposed recovery operations is invoked, STEP 1082. Such an operation effect routine may be a list of resource/operation pairs and the resulting effect on other resource(s) and state(s). In another implementation the operation effect routine may be as described in a co-filed, U.S. Patent Application, entitled "Method for Constraining Availability Impact between two or more Business Applications," Bobak et al., (POU920070115US1). A constraint analysis routine may be constructed as a fixed set of rules regarding which operations are allowable for recovery of a given resource. Alternatively, in one implementation, the constraints routine may be as described in a co-filed, U.S. Patent Application, entitled "Method for Constraining Availability Impact between two or more Business Applications," Bobak et al., (POU920070115US1).

Processing to construct the needed structure for submission of the recovery operations for execution may be performed in one of multiple ways, STEP 1084. In one implementation, a routine to build a workflow for the recovery operations, precursor operations, post execution operations and an end of workflow routine may be utilized as described in a co-filed, U.S. Patent Application, entitled "Method for Dynamic Generation of Workflows for Preparatory and Recovery Actions to Manage Availability Goals," Bobak et al., (POU920070123US1). Alternatively, recovery operations may be formed into a command file submitted to the operating system for execution, formed into a script language for submission for execution or acted on programmatically to invoke resource provided interfaces for recovery operations.

On return from construction of the structures required to submit the recovery operations for execution, a determination is made regarding execution of the recovery operations. If the recovery operations are to be executed, INQUIRY 1086, the routine to submit the recovery operations for execution is invoked, STEP 1088. In one implementation, this may be an invocation of a BPEL compliant workflow engine with the workflow created in STEP 1084.

If the recovery operations are not to be executed, INQUIRY 1086, the outage information is logged, STEP 1090. In one implementation, this includes logging of the CR. The CR is made available for reuse by setting the CR.Progress indicator to free, STEP 1092, and the CR most current event TOD (CR.MostCurrentEventTOD) to the current TOD, STEP 1094.

Recovery processing for one iteration is complete with submission of the recovery commands for execution or the logging and freeing of the outage data. Execution of the monitoring routines for the recovery process record status of recovery operation execution and on completion of the recovery process (see Recov_WF_End below) determines if a subsequent iteration of the data gathering (AsynchQueryBuild) and recovery process formulation are to be performed.

Picking Recovery Operation

One embodiment of the logic to select a recovery operation for a resource is described with reference to FIGS. 11A-11F. In one example, the BRM performs this logic.

Selection of a recovery operation for a resource receives as input identification of the resource from the routine which formulates the recovery process. On entry, the BRMD associated with the resource is retrieved, STEP 1100. From the BRMD, resource operation table entries having a category of recovery are retrieved, STEP 1102. Each returned operation table entry is processed, STEP 1104, by adding the resource, returned operation and returned operation escalation order (Order) from the operation table to a list of candidate recovery operations (result_set1), STEP 1106.

Figure 11A:
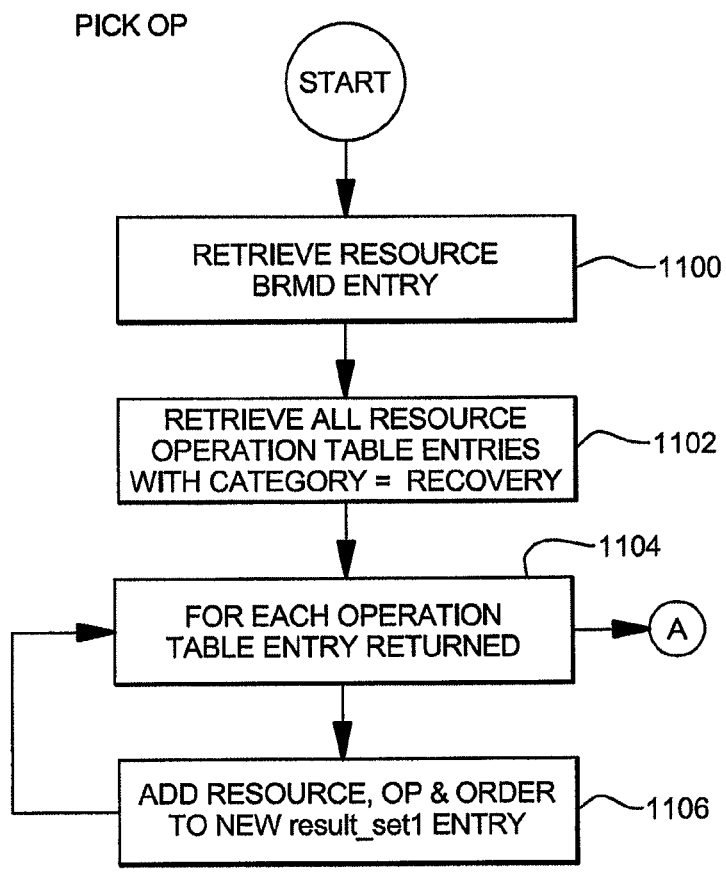
FIGS. 11A-11F depict one embodiment of the logic to select a recovery operation for a resource, in accordance with an aspect of the present invention.
Figure 11B:
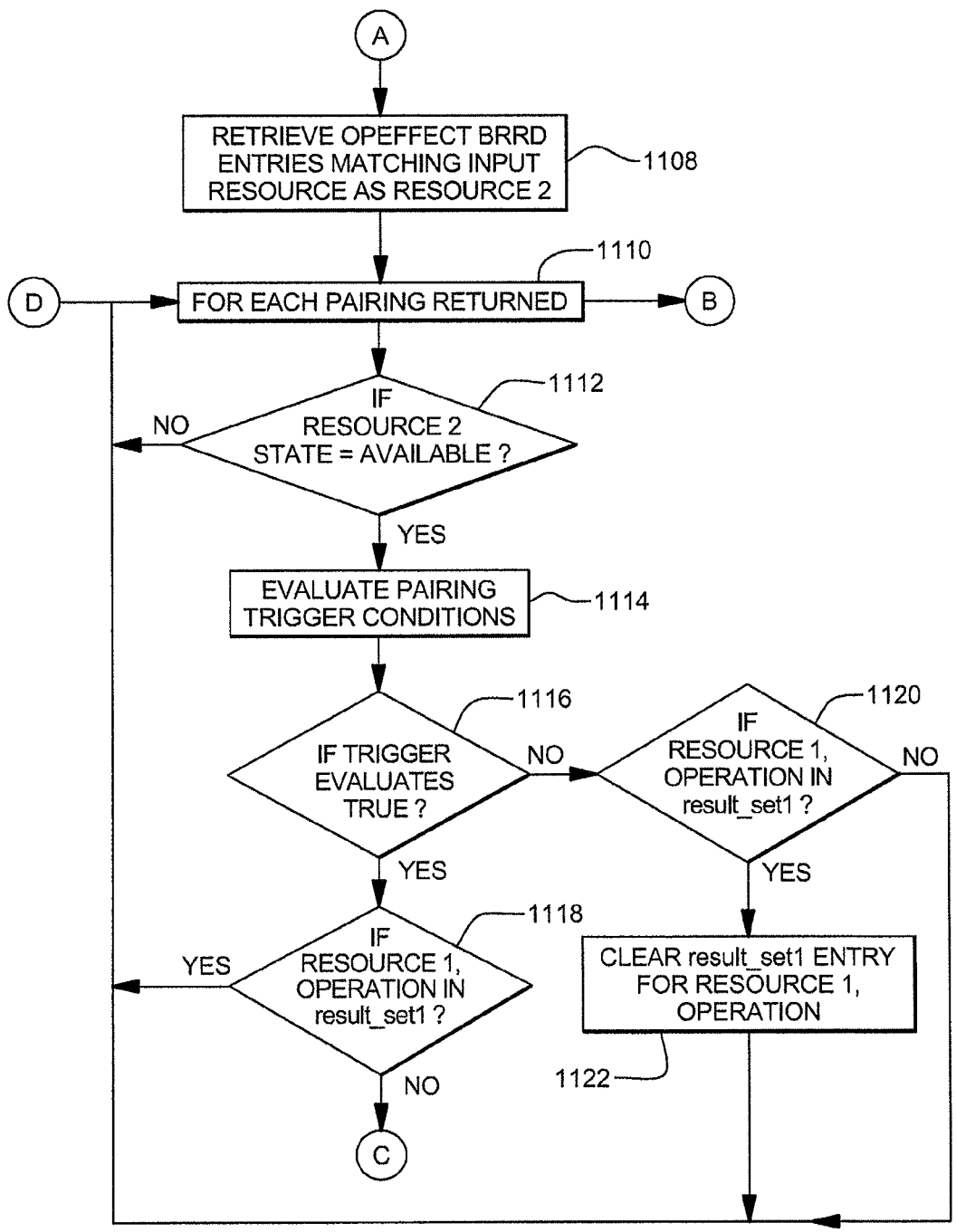
Figure 11C:
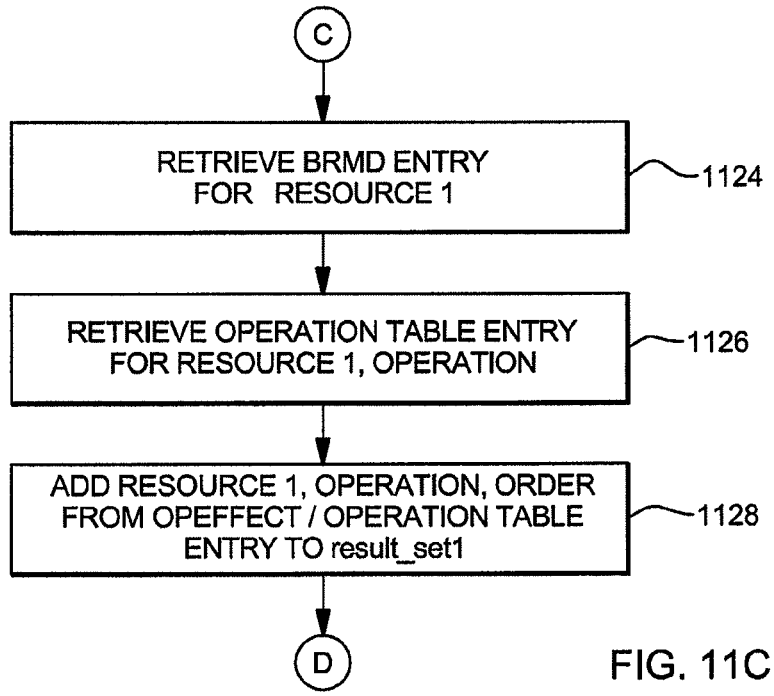

When the returned recovery operations for the resource have been processed, a selection from the BRRD is made matching on operation effect parings which have the input resource as resource2, STEP 1108 (FIG. 11B). Each returned pairing is evaluated, STEP 1110, by first determining if the resulting state for the pairing is an available state for the input resource, INQUIRY 1112. If not, the next pairing is evaluated, STEP 1110. Otherwise, the trigger conditions for the pairing are evaluated to determine if the pairing is currently applicable, STEP 1114. If the trigger conditions indicate the pairing is not currently applicable, INQUIRY 1116, the candidate list of operations is inspected. If the resource1/operation pair exists in the candidate list, INQUIRY 1120, it is removed from the candidate list of operations, STEP 1122, and the next returned pairing is evaluated, STEP 1110. If the resource1/operation pair does not exist, the next returned pairing is evaluated, STEP 1110.

Returning to INQUIRY 1116, if the trigger indicates the pairing is currently applicable, the candidate list of operations is inspected to determine if the resource 1/operation pair already exists, INQUIRY 1118. If resource1/operation has already been added to the candidate list of operations, the next returned pairing is evaluated, STEP 1110. Otherwise, the resource1/operation from the pairing under evaluation has not yet been included in the list of candidate operations. The BRMD for resource 1 from the pair is retrieved, STEP 1124, and the operation table entry for resource1/operation is retrieved, STEP 1126. The resource 1/operation from the operation effect pairing along with the Order for escalation from the operation table entry are added to the candidate list (result_set1), STEP 1128, and processing continues at STEP 1110 (FIG. 11B).

Figure 11D:
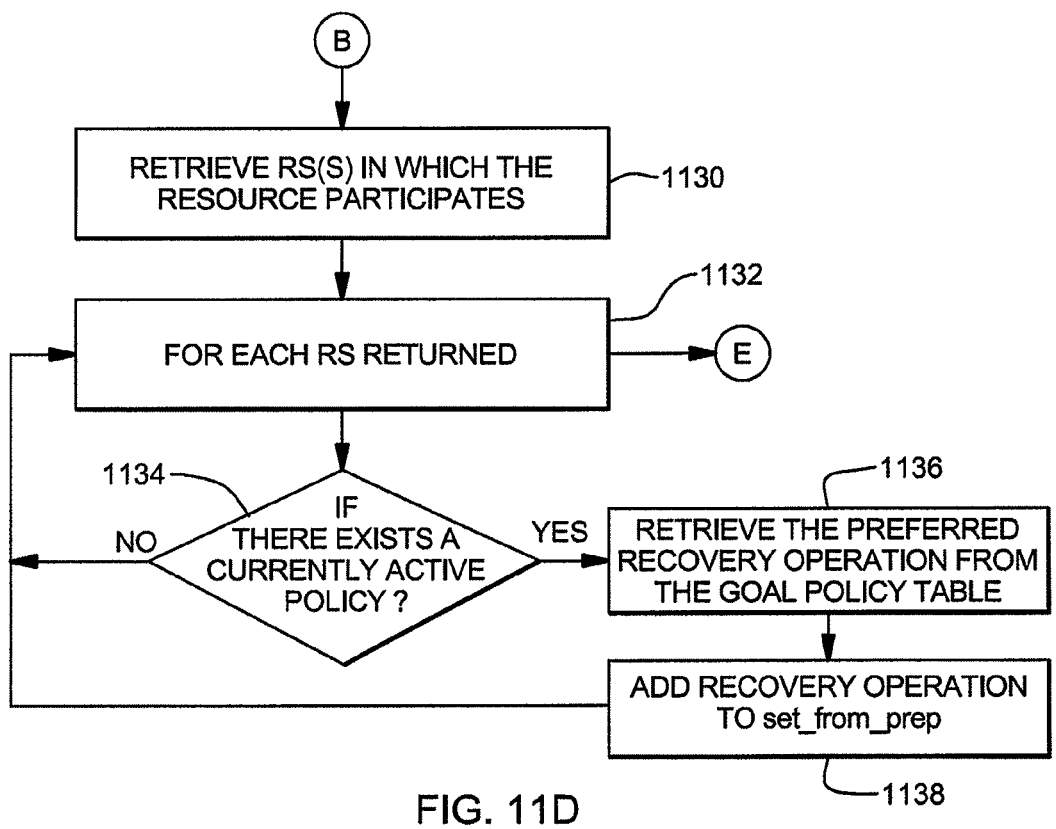

When all operation effect pairings have been evaluated for inclusion in the list of candidate operations, processing proceeds to determine the preferred recovery operation from when the availability policy was validated. All RS(s) in which the resource participates are retrieved, STEP 1130 (FIG. 11D). Each RS is evaluated, STEP 1132, by first determining if there exists an active policy associated with the RS, INQUIRY 1134. If not, the next RS is evaluated, STEP 1132. Otherwise, the recovery operation which was determined as being preferred at the time the policy was validated is extracted from the goal policy table, STEP 1136, and added to a list of preferred recovery operations (set_from_prep), STEP 1138, and the next RS is processed, STEP 1132.

Figure 11E:
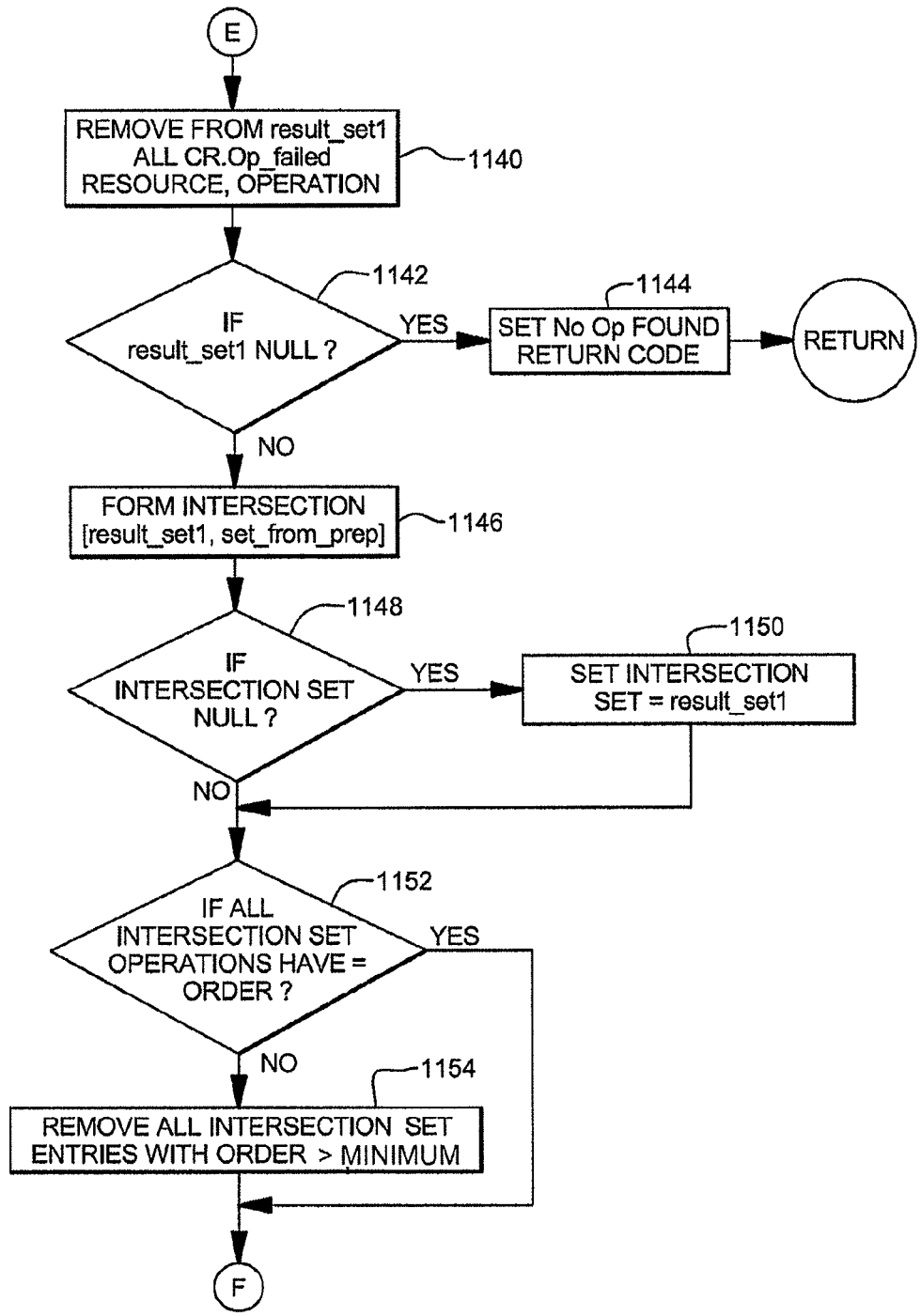

There now exists two lists of recovery operations. A list of currently applicable operations in result_set1 and a list of preferred recovery operations in set_from_prep. The next step in selection of a recovery operation is to remove any recovery operations which have already been attempted for this outage and which have failed to produce the anticipated result. Within the CR, a list of such operations is maintained by the monitoring routines for recovery process operation execution (see Monitoring of Recovery Process below). The list of attempted and failed operations (CR.OP_failed) is removed for the currently available candidate list (result_set1), STEP 1140 (FIG. 11E).

If the resulting currently applicable operations list becomes null as a result, INQUIRY 1142, an indication of no operation found is returned, STEP 1144. Otherwise, an intersection set is formed from the currently applicable operations list (result_set1) and the preferred recovery operations list (set_from_prep), STEP 1146. If the resulting intersection set is null, INQUIRY 1148, none of the preferred recovery operations from policy validation are currently viable. This may occur through escalation of recovery operations as failed recovery operation attempts are removed from the candidate list. Alternatively, it may occur as runtime environment conditions change making trigger evaluation for some recovery operations not currently applicable. If the intersection set is null, the intersection set is set equal to the currently applicable set of recovery operations (result_set1), STEP 1150. Processing to select a recovery operation is then continued using the intersection set as the source of candidate operations. Similarly, if the intersection set is not null, processing to select a recovery operation is continued.

Figure 11F:
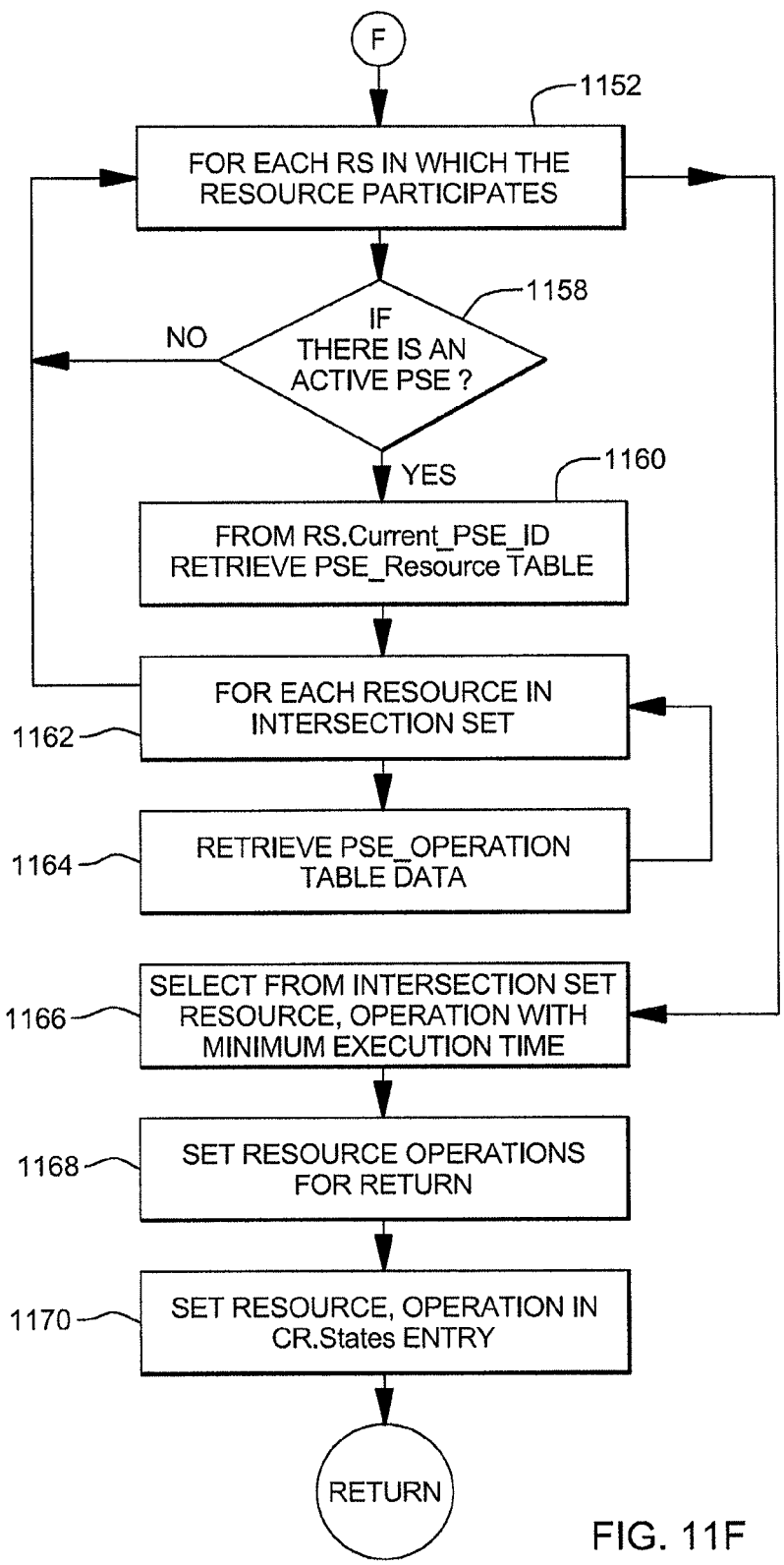

If all operations in the intersection set are not of the same escalation order, INQUIRY 1152, those having an order greater than the minimum escalation order of any operation in the intersection set are removed from the intersection set, STEP 1154. Thereafter, or if INQUIRY 1152 evaluates true, processing continues at STEP 1156 (FIG. 11F).

The intersection set now includes one or more operations of equivalent escalation order that are applicable within the current environment. Selection among them is based on operation execution time, as an example. Each RS with which the resource is currently associated is processed, STEP 1156. In one implementation, operation execution time could be associated with the operation table and constant for all environments over time. In another implementation, the current environment is represented by a PSE and has associated with it operation execution times which reflect how long the operation takes in a particular environment. If there exists no active policy and PSE for the RS under evaluation, INQUIRY 1158, the next RS is evaluated, STEP 1156.

Otherwise, a currently active PSE for a RS is retrieved (from RS.Current_PSE) and from the PSE the associated PSE resource table is located (PSE_Resource table), STEP 1160. Each resource in the intersection set is processed, STEP 1162, by retrieving the PSE operation table data, which includes the execution time duration for the operation along with statistics on standard deviation, STEP 1164, and processing continues with STEP 1162, until the resources of the intersection set have been processed. This data is saved with the operation in the intersection table entry for the resource/operation pair. Multiple operation execution times for a given resource/operation may be retrieved as a given resource and recovery operation may be associated with more than one RS each potentially having a different PSE, and therefore, different operation execution time data.

When all RS(s) associated with the resource have been processed, the intersection set has a list of resource/operation entries with associated execution time(s). The resource/operation having the minimum operation execution time from the intersection set is selected, STEP 1166. The selected resource/operation pair is set for return to the caller, STEP 1168, and the resource, operation is stored in the corresponding resource entry in the CR. States array, STEP 1170, before returning to the caller. This completes selection processing.

Monitoring of Recovery Process

Monitoring of recovery process execution occurs in two routines. One routine, Recov_WF_Monitor, executes at the completion of each operation in the recovery process. A second routine, Recov_WF_End, executes at completion of the entire set of operations in the recovery process.

Recov_WF_Monitor

One embodiment of the logic associated with Recov_WF_Monitor is described with reference to FIGS. 12A-12B. As one example, this logic is performed by the BRM.

Figure 12A:
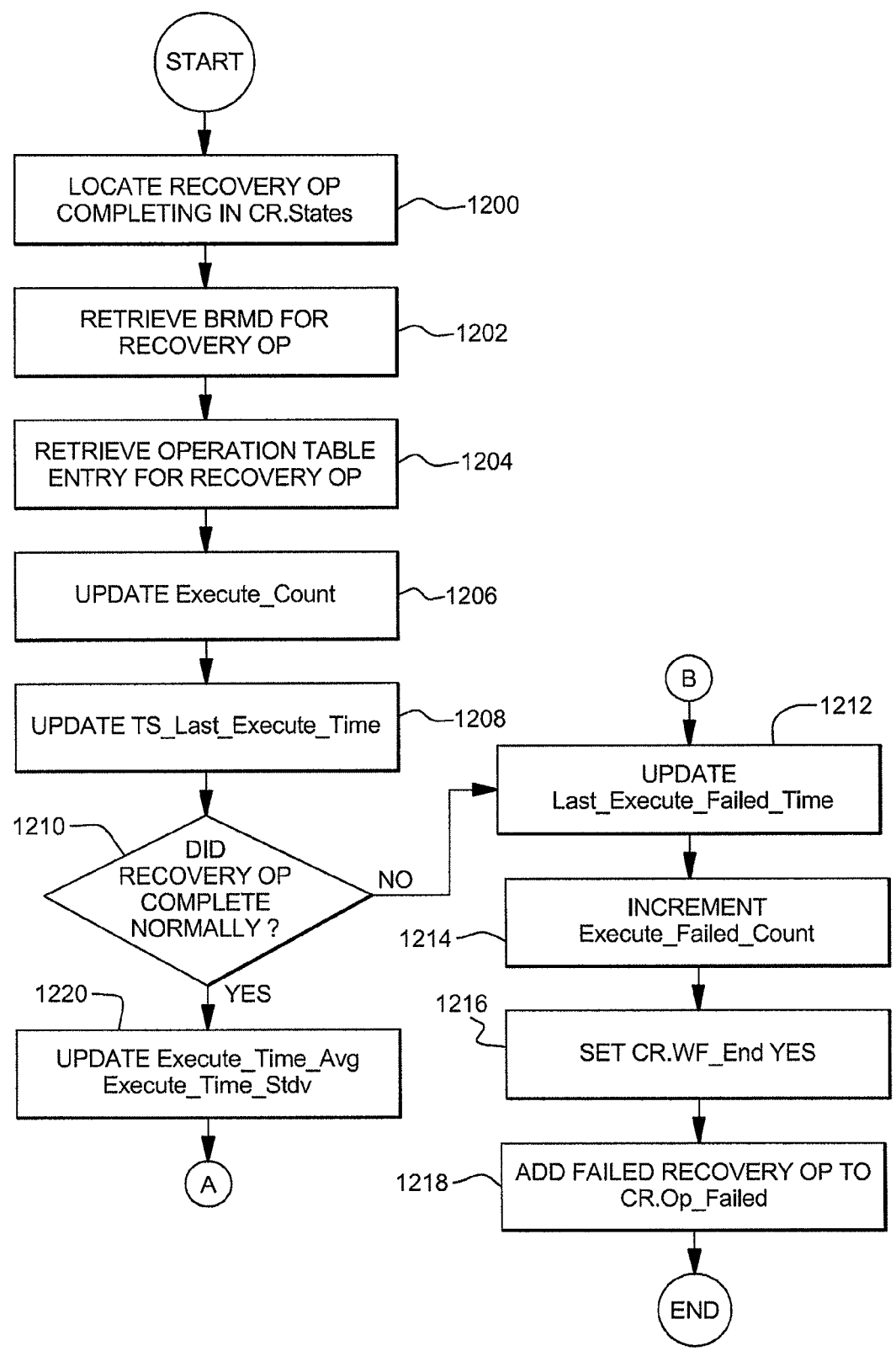
FIGS. 12A-12B depict one embodiment of the logic used to monitor recovery process execution, in accordance with an aspect of the present invention.
Figure 12B:
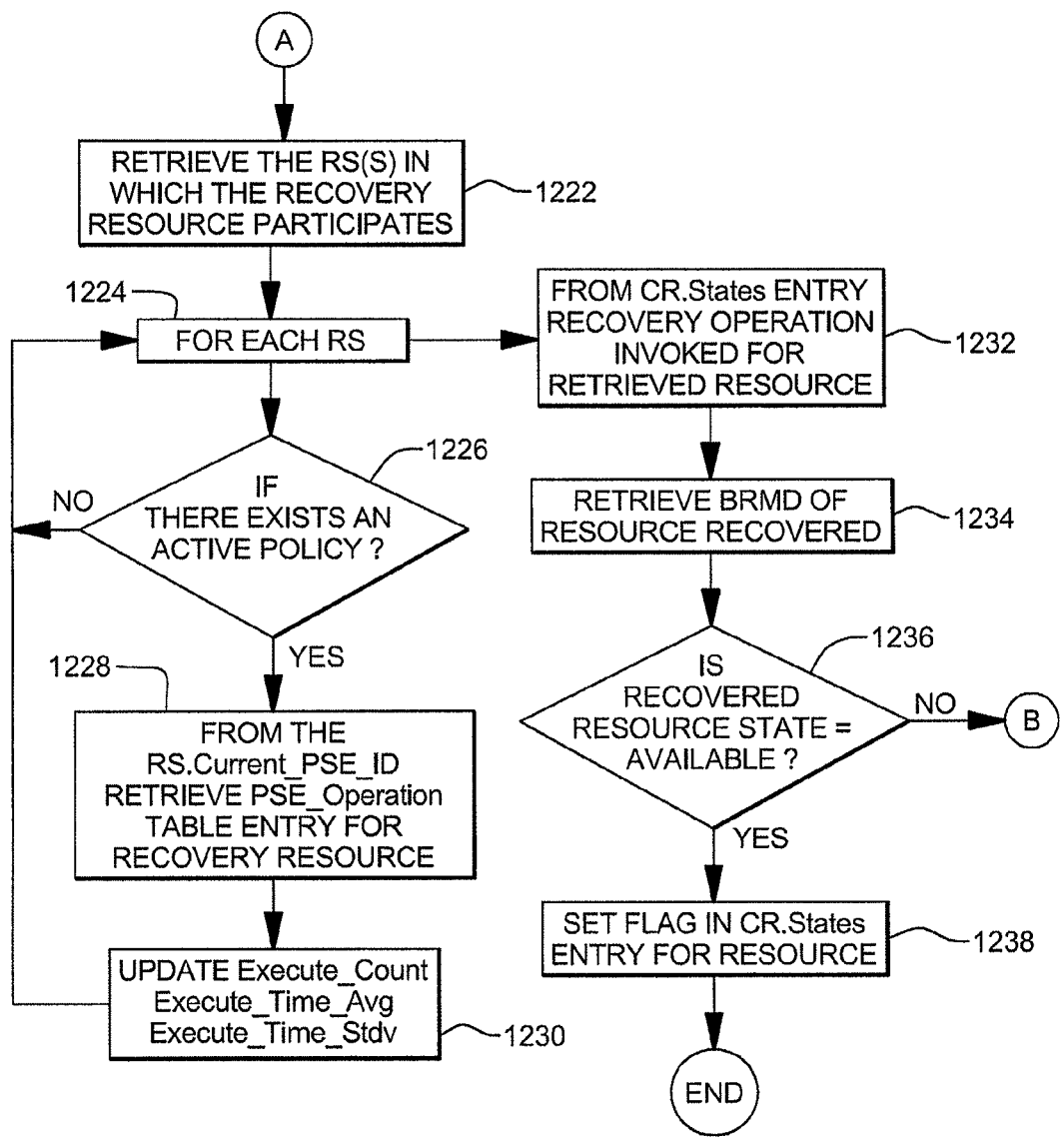

Referring to FIG. 12A, recovery monitoring at recovery operation completion begins by locating the recovery operation completing within the CR. States array of resources, STEP 1200. The resource on which a recovery operation was performed may or may not be the same as the resource for which a change in state is required as operations performed on one resource may have an impact on the state of other resources. The resource on which the operation was performed was stored in the CR.States array entry for the resource for which a state change is required for recovery when the recovery process was created. The BRMD associated with the resource on which the operation was performed is retrieved, STEP 1202. From the BRMD, the operation table entry for the recovery operation is retrieved, STEP 1204. The count of times the operation was executed is incremented, STEP 1206, and the TOD for when the operation was last executed is updated (TS_Last_execute_time), STEP 1208.

If the operation did not complete normally, INQUIRY 1210, the last failed operation execution time is updated (Last_Execute_Failed_Time), STEP 1212. The count of times the operation failed to execute as anticipated is incremented, STEP 1214. In one implementation, the remainder of the recovery operations are set to terminate by setting a flag (CR.WF_End) on, STEP 1216. In another implementation, subsequent recovery operations may be enabled to execute. The failed recovery operation is added to the list of failed recovery operations for the outage under recovery processing by updating the CR.Op-Failed list before the routine ends, STEP 1218.

Otherwise, the operation completed normally, INQUIRY 1210, and the statistics on operation execution time average and standard deviation are updated, STEP 1220.

Updates to the operation execution time for system environments represented by PSE(s) associated with the one or more RS(s) in which the recovery resource/operation participates are updated. In another implementation where operation execution environments represented by PSE(s) are not supported, updates to the statistics associated with the operation table from the BRMD as above may be sufficient.

The set of RS(s) in which the resource on which the recovery operation was performed are accessed, STEP 1222. For each RS in which the resource participates, STEP 1224, a determination is made regarding a currently active policy and associated PSE, STEP 1226. If no currently active policy and PSE exists, the next RS is evaluated, STEP 1222. Otherwise, the current PSE is located from the RS (RS.Current_PSE) and from the PSE, the PSE_Operation table entry for the resource on which the recovery operation executed is retrieved, STEP 1228. The statistics associated with the recovery operation are updated, STEP 1230, including, for instance, the count of executions of the operation, and the average and standard deviation of the operation execution duration. Processing then proceeds to the next RS, STEP 1224.

When all RS(s) have been processed, the CR entry for the recovered resource is updated. From the CR.States entry, the recovered resource is obtained, STEP 1232, and the associated BRMD entry is retrieved, STEP 1234. Evaluation of the current state of the recovered resource is made from the BRMD entry. If the resource is not in an available state, INQUIRY 1236, processing proceeds as in the case where the recovery operation did not operate as anticipated beginning at STEP 1212 through STEP 1218 (FIG. 12A).

Otherwise, the recovery operation made the resource to be recovered available, INQUIRY 1236 (FIG. 12B), and the CR entry associated with the recovered resource is updated to indicate a successful recovery was performed before ending the routine, STEP 1238.

Recov_WF_END

One embodiment of the logic associated with the Recov_WF_END routine is described with reference to FIG. 13. As one example, the BRM performs this logic.

Figure 13:
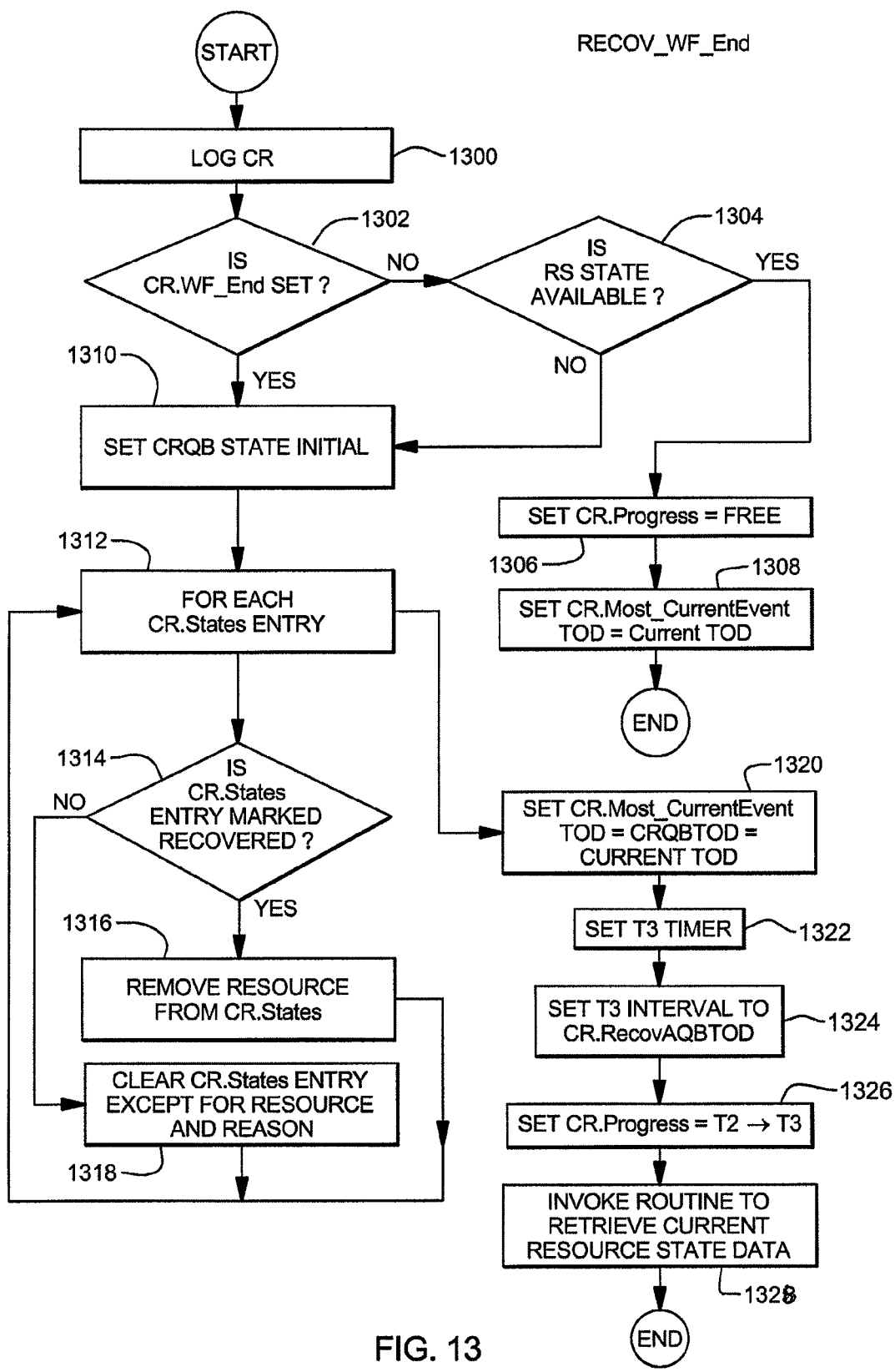
FIG. 13 depicts one embodiment of additional logic used to monitor recovery process execution, in accordance with an aspect of the present invention.

Referring to FIG. 13, processing performed when all recovery operations have been attempted or when the recovery operations have been terminated due to failure of one or more of the recovery operations begins by logging the associated CR, STEP 1300. If the recovery process was not terminated due to failure of one or more recovery operations, INQUIRY 1302, a determination is made if the RS is in an available state, INQUIRY 1304. If the RS is in an available state, recovery processing has completed. The CR is made available for reuse by setting the CR.Progress field to Free, STEP 1306, and setting the CR most current event TOD (CR.MostCurrentEventTOD) to the current TOD, STEP 1308, before ending the routine.

If RS state is unavailable or if CR.WF_END is set, recovery processing requires iteration and processing continues by setting up the CR for routines which retrieve the current state of resources associated with the CR (CRQBState set to Initial), STEP 1310. For each resource associated with the current outage as indicated in the CR.States array, STEP 1312, a determination is made if the resource has been recovered as indicated in the CR.States array field, INQUIRY 1314, updated by the routine monitoring completion of recovery operations, STEP 1316. If the resource has been recovered, it is removed from the CR.States array, STEP 1316, as it is no longer to be evaluated for recovery processing in the scope of the outage represented by the CR, and processing of the next resource in the CR.States array is begun, STEP 1312. Otherwise, the resource requires further recovery processing and the residual data from the last execution of the recovery process is cleared, STEP 1318, with the exception of the resource identification and the reason for the resource being considered for recovery evaluation within this CR. Processing then continues at STEP 1312.

When all resources associated with the CR have been processed, the CR is reset for processing performed by the routine which gathers current resource state data. The most current event TOD associated with the CR (CR.MostCurrentEventTOD) is set to the TOD associated with query for resource state processing (CRQBTOD) both being set to the current TOD, STEP 1320. Moreover, timer services is invoked, setting timer for CR.RecovAQBTOD+Current TOD, and exiting, when the timer expires, to close sliding window, STEPs 1322-1326. Further, the routine to retrieve current resource state data is invoked (e.g., AsynchQueryBuild, in one implementation), STEP 1328, and processing ends.

Described in detail herein is a capability for programmatically defining a recovery process that matches the scope of failure.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 14:
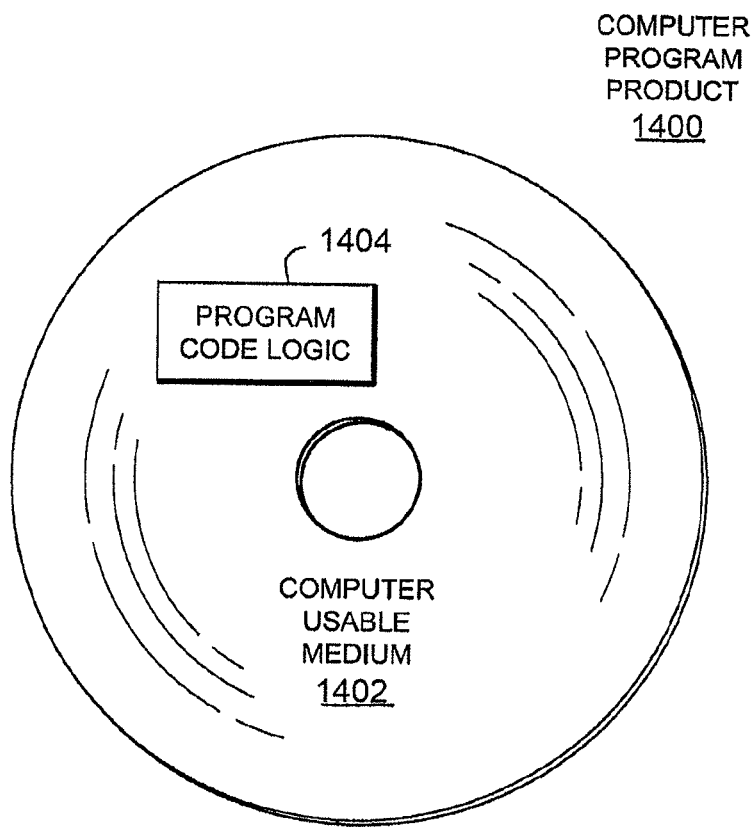
FIG. 14 depicts one embodiment of a computer program product incorporating one or more aspects of the present invention.

One example of an article of manufacture or a computer program product incorporating one or more aspects of the present invention is described with reference to FIG. 14. A computer program product 1400 includes, for instance, one or more computer usable media 1402 to store computer readable program code means or logic 1404 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for a technique to programmatically define a recovery process that matches the scope of failure. The definition is iterative and adaptive, and the resources to be recovered are programmatically selected, as well as the operations to be performed. The operations selected are based on real-time conditions of the environment.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating recovery in an Information Technology (IT) environment, said computer program product comprising:

a non-transitory computer readable storage medium readable by a processing circuit and storing instructions for execution by the processing circuit for performing a method comprising:

programmatically analyzing, at failure time, information relating to a failure within the IT environment to determine which resource of a plurality of resources is the resource corresponding to a root cause of the failure, said information being related to at least one of: one or more resources impacted by the failure, one or more implications of the failure, or one or more resources degraded by the failure, wherein the programmatically analyzing comprises iteratively analyzing the information to determine which resource is the resource corresponding to the root cause;

programmatically determining, at failure time, based on the programmatically analyzing, the root cause for the failure; and programmatically defining, at failure time, by a processor, one or more resources to be included in a set of resources to be recovered and one or more operations to be used in recovering the set of resources based on the analyzed information and the determined root cause, wherein said programmatically defining comprises:

determining, at failure time, the one or more resources affected by the failure, the determining based on the analyzed information and the root cause;

including the one or more resources determined at failure time to be affected by the failure in the set of resources to be recovered, wherein the set of resources is commensurate with a scope of the failure, as determined at failure time, in that the set of resources includes only those resources affected by the failure; and determining one or more operations to be performed on the set of resources, wherein the determining takes into consideration at least one of: an effect an operation has on a resource of the set of resources on which the operation is performed, an impact on at least one other resource of the set of resources, or a time it takes to perform the operation, wherein the determining the one or more operations is iterative, and wherein an operation selected to be used in recovery is an escalated operation having an increased severity, in response to a previous operation failing.

2. The computer program product of claim 1, wherein the programmatically defining comprises iteratively performing the defining to provide the one or more resources to be included in the set of resources.

3. The computer program product of claim 1, wherein the determining the one or more operations to be performed on the set of resources comprises selecting one or more operations that enable a defined recovery time goal to be met.

4. The computer program product of claim 1, wherein the method further comprises ordering the one or more operations to be executed.

5. The computer program product of claim 1, wherein the method further comprises executing at least a portion of the operations in parallel.

6. The computer program product of claim 1, wherein at least one operation of the one or more operations to be performed comprises a recovery process having at least one selected recovery operation, and wherein the method further comprises:

executing one or more selected recovery operations of the recovery process; and for each selected recovery operation that is executed, providing a completion indication to the recovery process.

7. The computer program product of claim 6, wherein the method further comprises performing one or more actions, subsequent to a completion of the recovery process.

8. The computer program product of claim 6, wherein the method further comprises providing a visualization of the recovery process.

9. The computer program product of claim 6, wherein the method further comprises monitoring an execution of at least one of the one or more selected recovery operations being executed or the recovery process.

10. The computer program product of claim 1, wherein a recovery impacts only those resources necessary to achieve a goal specified by a customer.

11. The computer program product of claim 1, wherein the failure is related to a business application of the IT environment, and wherein the business application has an availability goal associated therewith.

12. The computer program product of claim 1, wherein the set of resources comprises a non-responsive resource, and wherein the method further comprises invoking one or more operations for the non-responsive resource.

13. The computer program product of claim 1, wherein the set of resources includes only those resources affected by the failure and those resources to be recovered to meet a quantifiable management goal associated with a business application that is to use the set of resources.

14. The computer program product of claim 1, wherein the programmatically determining the root cause comprises assessing a state of one or more resources at failure time, and relationships associated with the one or more resources to determine the root cause.

15. A computer system for facilitating recovery in an Information Technology (IT) environment, said computer system comprising:

a memory; and a processor in communication with the memory, wherein the computer system is configured to perform a method, said method comprising:

programmatically analyzing, at failure time, information relating to a failure within the IT environment, said information being related to at least one of: one or more resources impacted by the failure, one or more implications of the failure, or one or more resources degraded by the failure;

programmatically determining, at failure time, based on the programmatically analyzing, a root cause for the failure; and programmatically determining a set of resources to be recovered and one or more recovery operations to be used in recovering the set of resources based on the analyzed information and the determined root cause, said set of resources being commensurate with a scope of the failure and said one or more recovery operations being selected based on a current state of the IT environment, wherein the determining the one or more recovery operations is iterative, and wherein a recovery operation selected to be used in recovery is an escalated operation having an increased severity, in response to a previous recovery operation failing.

16. The computer system of claim 15, wherein the determining the one or more recovery operations comprises selecting one or more operations that enable a defined recovery time goal to be met.

17. A method of facilitating recovery in an Information Technology (IT) environment, the method comprising:
  programmatically analyzing, at failure time, information relating to a failure within the IT environment, said information being related to at least one of: one or more resources impacted by the failure, one or more implications of the failure, or one or more resources degraded by the failure;
  programmatically determining, at failure time, based on the programmatically analyzing, a root cause for the failure; and
  programmatically determining, by a processor, a set of resources to be recovered and one or more recovery operations to be used in recovering the set of resources based on the analyzed information and the determined root cause, said set of resources being commensurate with a scope of the failure and said one or more recovery operations being selected based on a current state of the IT environment, wherein the determining the one or more recovery operations is iterative, and wherein a recovery operation selected to be used in recovery is an escalated operation having an increased severity, in response to a previous recovery operation failing.

18. The method of claim 17, wherein the determining the one or more recovery operations comprises selecting one or more operations that enable a defined recovery time goal to be met.

19. The method of claim 17, wherein at least one recovery operation of the one or more recovery operations comprises a recovery process having at least one selected recovery operation, and wherein the method further comprises:
  executing one or more selected recovery operations of the recovery process; and
  for each selected recovery operation that is executed, providing a completion indication to the recovery process.

20. A computer program product for facilitating recovery in an Information Technology (IT) environment, the computer program product comprising:
  a non-transitory computer readable storage medium readable by a processor and storing instructions for execution by the processor for performing a method comprising:
    programmatically analyzing, at failure time, information relating to a failure within the IT environment, said information being related to at least one of: one or more resources impacted by the failure, one or more implications of the failure, or one or more resources degraded by the failure;
    programmatically determining, at failure time, based on the programmatically analyzing, a root cause for the failure; and
    programmatically determining a set of resources to be recovered and one or more recovery operations to be used in recovering the set of resources based on the analyzed information and the determined root cause, said set of resources being commensurate with a scope of the failure and said one or more recovery operations being selected based on a current state of the IT environment, wherein the determining the one or more recovery operations is iterative, and wherein a recovery operation selected to be used in recovery is an escalated operation having an increased severity, in response to a previous recovery operation failing.

* * * * *